(12) United States Patent
Hartkop et al.

(10) Patent No.: US 7,573,491 B2
(45) Date of Patent: Aug. 11, 2009

(54) METHOD FOR FORMATTING IMAGES FOR ANGLE-SPECIFIC VIEWING IN A SCANNING APERTURE DISPLAY DEVICE

(76) Inventors: David Hartkop, 4070 Willow Springs Rd., Central Point, OR (US) 97502;
Jason Dunn, 8219 Manchester Blvd., Apt. 3, Playa Del Ray, CA (US) 90293

( * ) Notice: Subject to any disclaimer, the term of this patent is extended or adjusted under 35 U.S.C. 154(b) by 396 days.

(21) Appl. No.: 11/176,726

(22) Filed: Jul. 7, 2005

(65) Prior Publication Data
US 2005/0264560 A1  Dec. 1, 2005

Related U.S. Application Data

(63) Continuation-in-part of application No. 10/817,592, filed on Apr. 2, 2004.

(51) Int. Cl.
*G09G 5/12* (2006.01)
*G09G 5/42* (2006.01)

(52) U.S. Cl. .................. 345/672; 345/545; 345/419

(58) Field of Classification Search .......... 345/672, 345/545, 419
See application file for complete search history.

(56) References Cited

U.S. PATENT DOCUMENTS

| | | | |
|---|---|---|---|
| 3,684,866 A * | 8/1972 | Jones | 250/566 |
| 4,130,337 A | 12/1978 | Okoshi | |
| 4,378,142 A | 3/1983 | Ono | |
| 4,642,790 A * | 2/1987 | Minshull et al. | 715/784 |
| 5,293,481 A * | 3/1994 | Mita et al. | 345/505 |
| 5,416,509 A | 5/1995 | Sombrowsky | |
| RE35,029 E * | 8/1995 | Sandor et al. | 355/22 |
| 5,451,981 A * | 9/1995 | Drako et al. | 345/620 |
| 5,521,724 A | 5/1996 | Shires | |
| 5,528,751 A * | 6/1996 | Priem et al. | 345/545 |

(Continued)

FOREIGN PATENT DOCUMENTS

JP  63-287988  11/1988

(Continued)

OTHER PUBLICATIONS

Forward image mapping Baoquan Chen; Dachille, F.; Kaufman, A.; Visualization '99. Proceedings Oct. 24-29, 1999 pp. 89-514 Digital Object identifier 10.1109/VISUAL.1999.809872.*

(Continued)

*Primary Examiner*—Javid A Amini
(74) *Attorney, Agent, or Firm*—Keusey, Tutunjian & Bitetto, P.C.

(57) ABSTRACT

A method for formatting images for angle specific viewing in a scanning aperture dimensional display device. Input images are rearranged into slices or sections to create a set of output images. The images derived from the output images are formed by rearranging the image slices or sections and disposing the image to be viewed directly behind an open aperture in an aperture plate in a scanning aperture display device. By cycling the images in relation to the cycling of the open apertures of the aperture plate, angle specific viewing of the scanning aperture display can be provided. The number angles for angle specific viewing can be varied and can range from 2-1000 distinct viewing angles from a single scanning aperture display device.

10 Claims, 23 Drawing Sheets

U.S. PATENT DOCUMENTS

| | | | |
|---|---|---|---|
| 5,742,294 A * | 4/1998 | Watanabe et al. | 345/672 |
| 5,781,165 A * | 7/1998 | Tabata | 345/8 |
| 5,793,503 A | 8/1998 | Haines et al. | |
| 5,889,612 A | 3/1999 | Van De Ven | |
| 5,926,294 A | 7/1999 | Sato et al. | |
| 5,936,774 A | 8/1999 | Street | |
| 5,973,831 A | 10/1999 | Kleinberger et al. | |
| 6,061,083 A | 5/2000 | Aritake et al. | |
| 6,078,351 A | 6/2000 | Hall, Jr. et al. | |
| 6,094,216 A * | 7/2000 | Taniguchi et al. | 348/51 |
| 6,157,474 A | 12/2000 | Orr et al. | |
| 6,169,613 B1 | 1/2001 | Amitai et al. | |
| 6,201,565 B1 | 3/2001 | Balogh | |
| 6,202,178 B1 * | 3/2001 | Spruyt | 714/702 |
| 6,229,562 B1 | 5/2001 | Kremen | |
| 6,252,707 B1 | 6/2001 | Kleinberger et al. | |
| 6,275,615 B1 * | 8/2001 | Ida et al. | 382/232 |
| 6,459,532 B1 | 10/2002 | Montgomery et al. | |
| 6,462,871 B1 | 10/2002 | Morishima | |
| 6,473,209 B1 | 10/2002 | Popovich | |
| 6,481,849 B2 | 11/2002 | Martin et al. | |
| 6,584,237 B1 * | 6/2003 | Abe | 382/299 |
| 6,595,644 B2 | 7/2003 | Kostrzewski | |
| 6,667,819 B2 | 12/2003 | Nishikawa et al. | |
| 6,674,463 B1 * | 1/2004 | Just et al. | 348/43 |
| 2002/0001128 A1 | 1/2002 | Moseley et al. | |
| 2002/0030888 A1 | 3/2002 | Kleinberger et al. | |
| 2002/0047964 A1 | 4/2002 | Ueda et al. | |
| 2002/0080152 A1 * | 6/2002 | Sudo et al. | 345/672 |
| 2002/0154349 A1 | 10/2002 | Halldorsson et al. | |
| 2002/0159111 A1 | 10/2002 | Suzuki et al. | |
| 2002/0163482 A1 * | 11/2002 | Sullivan | 345/6 |
| 2002/0163679 A1 | 11/2002 | Kim | |
| 2003/0026474 A1 * | 2/2003 | Yano | 382/154 |
| 2003/0086136 A1 | 5/2003 | Orr et al. | |
| 2003/0179424 A1 | 9/2003 | Kihara et al. | |
| 2003/0202228 A1 | 10/2003 | Takada et al. | |
| 2004/0017507 A1 * | 1/2004 | Clayton | 348/407.1 |
| 2004/0138831 A1 * | 7/2004 | Watanabe et al. | 702/33 |
| 2004/0196305 A1 * | 10/2004 | Okuno et al. | 345/698 |
| 2004/0215682 A1 * | 10/2004 | Kim | 708/300 |
| 2005/0134622 A1 * | 6/2005 | Yamaguchi et al. | 347/15 |
| 2006/0078180 A1 * | 4/2006 | Berretty et al. | 382/128 |
| 2006/0232596 A1 * | 10/2006 | Barenburg et al. | 345/581 |
| 2006/0239345 A1 * | 10/2006 | Taubman et al. | 375/240.03 |
| 2007/0142723 A1 * | 6/2007 | Leach et al. | 600/410 |

FOREIGN PATENT DOCUMENTS

| | | |
|---|---|---|
| JP | 05-341704 | 12/1993 |
| JP | 06-266274 | 9/1994 |
| JP | 2000-250387 | 9/2000 |

OTHER PUBLICATIONS

Multiple viewpoint rendering Michael Halle Jul. 1998 Proceedings of the 25th annual conference on Computer grahics and interactive techniques SIGGRAPH '98 Publisher: ACM Press.*

Applications: Tour into the video: image-based navigation scheme for video sequences of dynamic scenes Hyung Woo Kang, Sung Yong Shin Nov. 2002 Proceedings of the ACM symposium on Virtual reality software and technology VRST '02 Publisher: ACM Press.*

S. Hentschke et al., Hologram Display Model, WAM P1.1, 1999 IEEE, pp. 130-131.

Richard E. Holmes, 3-D TV Without Glasses, IEEE AES Systems Magazine, Sep. 1991, pp. 20-25, Xenia, OH.

R.E. Abdel-Aal, Expansion of two-dimensional imaging apertures for resolution improvement in long-wavelength holography, IEEE Proceedings, Jun. 1990, pp. 157-162, vol. 137, Pt 1, No. 3.

M. M. Li, S. Tang, R. T. Chen, A three-dimensional (3-D) substrate-guided-wave to free-space multistage optoelectronic interconnection using wavelength division multiplexing and space division demultiplexing, Journal of lightwave technology, Mar. 1996, pp. 365-369, vol. 14, No. 3.

Siegbert Hentschke, Andreas Herrfeld, Hologram Display- Principle, 3-Dimensional Representation, and Sampling, 11 pages, IPM Institute, Unversity Kassel, Germany.

A.R.L. Travis, The Display of Three-Dimensional Video Images, Proceedings of the IEEE, Nov. 1997, pp. 1817-1832, vol. 85, No. 11, Cambrige, UK.

Y. Li, D. Abookasis, J. Rosen, Computer-generated holograms of three-dimensional realistic objects recorded without wave interference, Applied Optics, Jun. 10, 2001, pp. 2864-2869, vol. 40, No. 17, Optical society of America.

G. J. Woodgate et al., Observer tracking autostereoscopic 3-D display systems, 11 pages, Sharp Laboratories of Europe Ltd.

L. Lipton, et al.; "Eliminating -Cell Artifacts", Proc. of SPIE vol. 3957; Apr. 2000; pp. 264-270.

* cited by examiner

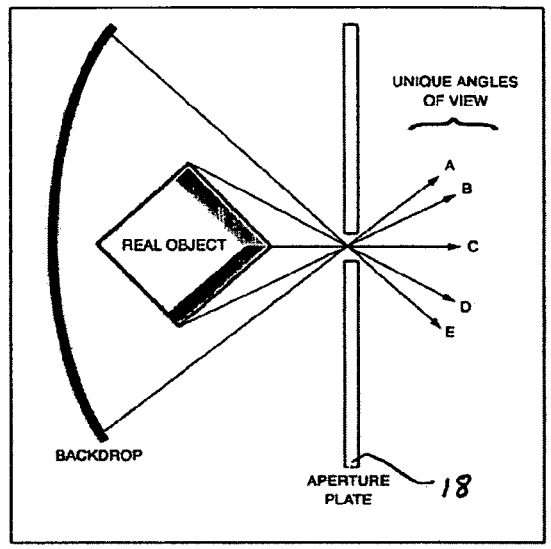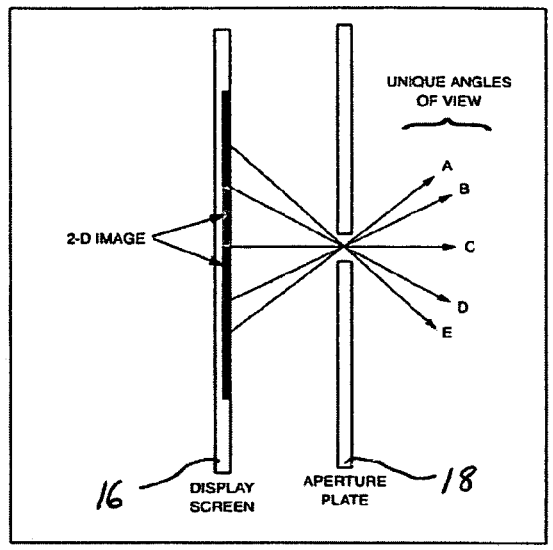
FIG. 5            FIG. 6
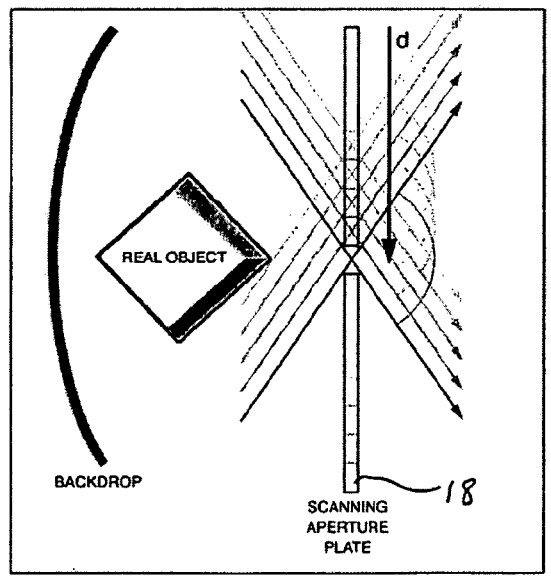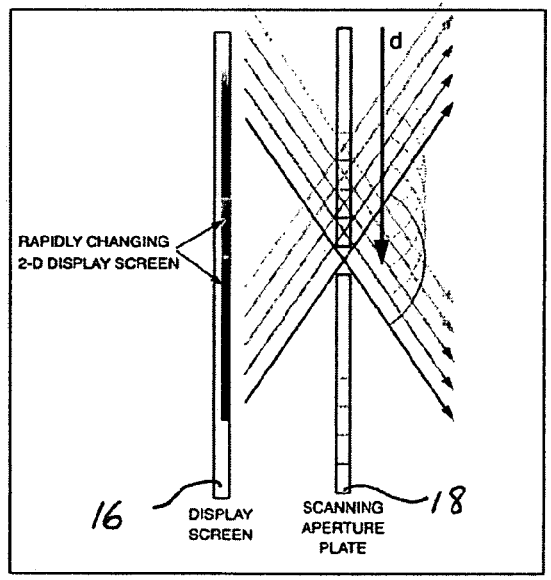
FIG. 7            FIG. 8 input image 57 of 96 output image 12 of 24

METHOD FOR FORMATTING IMAGES FOR ANGLE-SPECIFIC VIEWING IN A SCANNING APERTURE DISPLAY DEVICE

CROSS REFERENCE TO RELATED APPLICATIONS

This application is a Continuation in Part of co-pending U.S. patent application Ser. No. 10/817,592 filed Apr. 2, 2004.

BACKGROUND OF THE INVENTION

1. Field of the Invention

The present invention relates to multi dimensional image reproduction, and more particularly, it relates to a method for angle specific viewing in an image reproduction device such as a scanning aperture device.

2. Description of the Prior Art

Various approaches to 3D image reproduction have been experimented with and implemented in different aspects of industrial life. Many of today's current imaging applications are requiring of more detail and the ability to "look around" or see all sides of an image in true 3D representation. Some exemplary applications for such imaging include Medical, Military and other industrial and recreational fields.

Angle specific viewing of images allows one display device to display different images to different viewers based on their viewing angle with respect to the display device. In order to produce different angle dependent views, the input images must be formatted to enable accurate reproduction at the desired viewing angle. Current methods for formatting images for autostereoscopic display offer little flexibility in terms of the number of angles used and the resolution of the images to be formatted. The present invention overcomes this shortfall of the prior art by providing an easily implemented method for formatting images for both 2d and 3d display devices utilizing the scanning aperture method of display.

SUMMARY OF THE INVENTION

According to one aspect of the invention, the method for formatting images for angle specific viewing in a scanning aperture display device includes rearranging the pixels within a set of input frame images to create a set of output input images, and shifting the set of output images along a horizontal axis such that a center of each output image is positioned behind an aperture through which the image is to be viewed.

The rearranging of input frame images includes dividing each of the input images into a plurality of slices, and producing the output image as a projection image from the plurality of slices.

The producing of output images generally involves selecting slices from the same spatial location in each of the input frame images and arranging the selected slices in a predetermined order to produce the output image.

According to another aspect of the invention, the output images are each translated horizontally by a predetermined number of slice-widths in order to position the center of each image below the position of a single open aperture. According to yet another aspect of the invention, the output images are each translated horizontally by a predetermined number of slice-widths in order to position the center of each projection image below the position of more than one open aperture.

In accordance with another aspect of the invention, the method for formatting images for angle specific viewing in a scanning aperture display device includes rearranging a set of input frame images to create a set of output input images, shifting the set of output images such that a center of each output image is positioned behind an aperture through which the image is to be viewed, and cycling through said set of output images, said cycling being coordinated with the cycling of open apertures in the scanning aperture display.

According to another aspect of the invention, the rearranging includes identifying bands of images corresponding to related slices in each input image frame, where each band consists of a number of slices placed side by side. The total number of identified bands, which may be wholly or partially displayed (in the event that a band partially falls off either edge of the screen), is equal to the horizontal resolution of the screen (measured in image slices, which are typically one pixel wide), divided by the number of discreet angles to be represented. The number of slices in each band is equal to the number of discreet angles to be presented.

According to a multi-axis aspect of the invention, the rearranging includes dividing the input image frames into sections, labeling the sections, and reconfiguring the sections into projection images.

Other aspects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views:

FIGS. 5 and 6 demonstrate aperture view equivalence according to an embodiment of the invention;

FIGS. 7 and 8 demonstrate persistence of vision according to an embodiment of the invention;

DETAILED DESCRIPTION OF PREFERRED EMBODIMENTS

Figure 1:
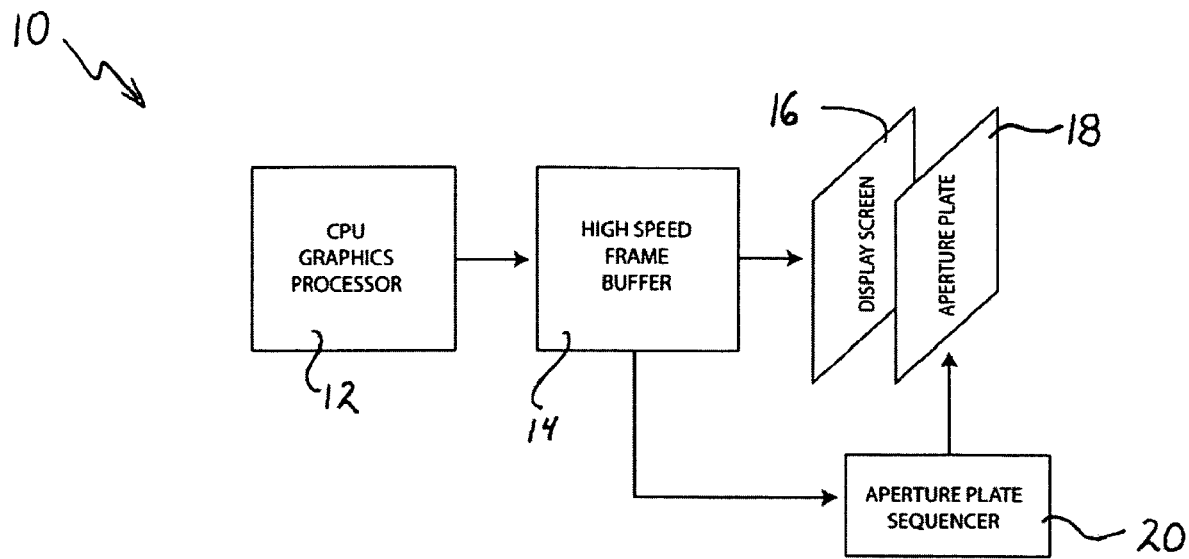
FIG. 1 is a block diagram of the scanning aperture holographic display system according to an embodiment of the invention.

Referring to the block diagram of FIG. 1, there is shown a general depiction of the scanning aperture three dimensional display system 10 according to an embodiment of the invention. In a basic form, the system includes a central processing unit/graphic processor 12, a high speed frame buffer 14, a display screen 16, an aperture plate 18 and an aperture plate sequencer 20.

The embodiment of FIG. 1 is a solid state example of the invention, having no moving parts. In accordance with various embodiments, described herein, the display screen 16, aperture plate 18, aperture plate sequencer 20 and other hardware/software components can be implemented in many different ways without departing from the spirit of the invention. In accordance with other embodiments, the apertures in the aperture plate 18 can be of different configuration. These embodiments are discussed in detail below, however a brief explanation of the operating principles and considerations in the implementation of the scanning aperture 3 dimensional (3D) image display system of the present invention are explained first.

Images produced by means of the scanning aperture display of the present invention can be termed holograms in the broader conceptual definition. As described earlier, standard holography is based on optical interference to produce unique light patterns for a given viewing angle. In contrast, the scanning aperture display relies on the viewer's parallax angle and human persistence of vision. In the terms of autostereoscopic display technology, this system produces what may be termed a parallax panoramagram.

The fundamental basis for the reconstruction of three-dimensional images using the scanned aperture technique is a property termed herein as aperture-view equivalence (AVE). Aperture-view equivalence (AVE) describes an aperture as being a window through which only one dimension (a single ray of light at a specific angle to the normal) may be viewed by a viewer at a particular angle to that aperture. It should be noted that the observer's distance from the display is not of critical importance, as an image of appropriate perspective will be constructed over a range of actual distances from the display. The viewer's angle of view is considered to be at a fixed distance from the small aperture, and to rotate in longitude and latitude about a point fixed in the center of the aperture. Thus, it becomes clear that total viewable light pattern transmitted through a single aperture can be described by just two dimensions: a rotation (or translation) along a vertical axis, and a rotation (or translation) along a horizontal axis. In essence, any light source, be it three or two-dimensional will be transmitted through an aperture in just two dimensions. In this way, the views of a three-dimensional object or a two dimensional projection through an aperture can be quantitatively equivalent.

FIGS. 5 and 6 demonstrate AVE. In FIG. 5, a real object, in this case a cube, floats before a black backdrop. The cube is viewed through the aperture and can be seen from anywhere between angles B and D. Angles A and E provide only a view of the backdrop. FIG. 6 utilizes a flat display screen 16 in place of the real object. It is noteworthy, however, that the views through the aperture from angles A through E are identical to those in FIG. 5.

Image Construction through Persistence of Vision

Due to AVE, it is possible to mimic the appearance of a three-dimensional object with a two-dimensional view screen, provided that the field of view is projected through a single visual point (i.e., an aperture). What remains is a method for constructing a continuous image field made up of many such individual apertures. It is not spatially practical to simply place apertures side-by-side, as there is a required distance that must be maintained between each in order to afford sufficient non-overlapping viewing angles with respect to the 2-D display screen behind. Such a screen would either appear as a series of discreet dots against a black background, or would make a trade off in angular resolution in order to place apertures closer together. The preferred method to preserve both angular resolution and resolution of the display field under this paradigm is to dramatically increase the resolution of the 2-D display screen. This, for many practical reasons, is not a desirable solution. An alternative to the use of static apertures as discussed above is the use of scanning, or dynamic apertures. Such apertures are made to change location in the display field with respect to time, and, because of human 'persistence of vision' can be used to construct a fully-filled display field.

For the purpose of this discussion, "Persistence of Vision" (POV) is defined as a property of human vision that causes it to interpret many brief visual states as a single or continuous perceived visual state. For example, a row of sequentially flashing lights will appear to glow simultaneously if the flash rate of each light is substantially high enough. As a simplified example, a single blinking light will appear to glow continuously if its rate of blinking is fast enough. For a general benchmark, a light blinking at or above roughly 50 Hz will appear to glow continuously. This property of vision has also been found to apply to the viewing of light transmitted through shuttered or moving apertures. This suggests a new method for filling a display field with only light transmitted through apertures. If each aperture exists in at a location in the display field for only a brief period of time, the open apertures in the display field will be made to exist at a new location, shifted spatially by the width or height of one aperture. This sequencing of aperture position continues until all points of the display field have been occupied by an open aperture for a brief period of time. The sequence then resets. Assuming the entire sequence can be performed at or above 50 Hz, that is, within the time of $\frac{1}{50}^{th}$ of a second, the translation of individual aperture positions will not be apparent.

FIG. 7 demonstrates how an aperture may be scanned across a viewer's visual field to provide a more complete view of the cube for the viewer. The rapidly moving aperture, in this case a slit, does not appear as a single moving band of view. Instead, because of 'persistence of vision,' the entire scanning-aperture plate appears to become transparent for a moment. If the scanning is rapidly repeated, the plate will remain transparent to the viewer. The viewer will have an accurate three-dimensional view through the image plate at a truly three-dimensional object. FIG. 8 shows how an identical aperture may be scanned before a two-dimensional display device 16 in order to 'blend together' the positions of individual apertures, similarly constructing an entire display field. In order to reconstruct a truly three-dimensional image, however, the display screen 16 must represent an accurate two-dimensional projection with respect to the given aperture position. For this reason, every change in aperture position (d) requires a change in the 2-D image displayed. To clarify, the perspective from each different viewing angle to be made available requires the display of a separate 2-D image behind each momentarily open aperture. Apertures are sequenced in a cyclic manner, the period of each cycle being less than the persistence of vision threshold of human sight. With these conditions met, the view of a virtual object through such a display will appear equivalent to that of a real object in three-dimensional space. This cycle need not be sequential, as the various aperture positions may be stepped through in any non-repeating order within the required time period.

Figure 2:
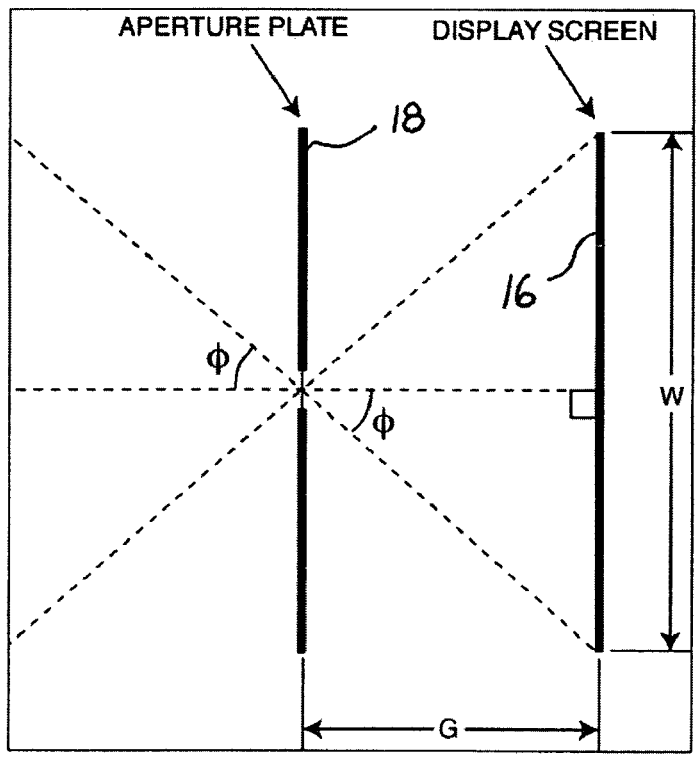
FIG. 2 is a plan view of the geometric relations of 3D display system according to an embodiment of the invention.

FIG. 2 shows the geometric relationship between the display system's Maximum Viewing Angle (given as Φ in degrees), the Gap (given as G, in meters), and the Aperture Projection Width W is the width of a region of image on the display screen directly behind the aperture, having a width equal to the width of the aperture multiplied by the number of discrete viewing angles. It is intended to be viewed over a specific range of angles through the aperture, and so is centered directly behind the given aperture. The Maximum Viewing Angle Φ defines the maximum angle (away from the normal projection through the aperture) at which light originating from within the Aperture Projection Width is still visible through the aperture. The Gap G is defined as the distance measured from the plane of the optically active region of the aperture plate 18 to the light-emitting surface of the video display screen 16. Gap G can be any distance, but most commercially acceptable embodiments will have a gap in a range of 0.1 cm-5 cm, according to various embodiments of the invention. The mathematical relationship between these elements in proper configuration is given as follows:

$$\tan(\Phi) = \frac{W}{2G}.$$

The value of W can be described as the product of the aperture width (given as P, in meters) and the total number of discreet viewable angles to be constructed by the display (given as A.)

$$W = PA$$

By substitution, the length of G and the Maximum Viewing Angle of the display relate to A and P as given:

$$\tan(\Phi) = \frac{PA}{2G} = \frac{W}{2G}$$

For a given implementation, the value of P (i.e., the aperture width), is also equal to (or slightly larger than the pixel width. Because the width of the aperture is close to the width of a pixel on the display screen, the resolution of the 3D image will approach or match the resolution of the display screen.

The key to the effect of constructing true 3-dimensional images is the ability to produce a variety of discreet viewing angles, which radiate away from any particular point on the screen. In effect, each point on the display screen can be observed to have several different values of brightness and color, depending on the viewer's perspective. A single axis system (meaning only horizontal parallax) has discreet viewable angles viewed through vertical slit-type aperture. The single axis system may be viewed by moving horizontally while observing the screen. A two-axis system (having both horizontal and vertical parallax, described in later embodiments) has discreet viewable angles viewed through different type apertures (e.g., pinholes, etc.). The two axis system may be viewed by moving horizontally as well as vertically while observing the screen.

During operation of a scanning aperture display, the number of discreet viewable angles A will most likely be less than the display screen's total pixel-count along the axis in consideration. (Pixel count for an axis, or resolution R). In order to maximize light output of the display, multiple apertures can be used at once. Optimally, an open aperture will be located every A'th aperture over R pixels. The following equation describes the relationship between A, R, and the total number of open apertures for a given moment (given as whole number a.):

$$a = \frac{R}{A}$$

This equation assumes that R is a whole number multiple of A. It is not necessary for this to be true, but it is somewhat convenient when designing a system.

Frame Rate and Aperture Response Time

During operation, the elements of the aperture plate must rapidly change states in sequence, transitioning momentarily from opaque to transparent and back. This succession of rapid state transitions emulates a moving or scanning aperture, either a pinhole, a slit or other aperture configuration depending on the aperture type. For each transparent 'aperture' configuration, a different video image is displayed on the display screen behind. The frame rate r (frames per second) of the required display screen is described in terms of viewable angles A:

$r = $ (refresh rate)$(A)$

This relationship acknowledges the fact that, in order to visually blend or composite the sequencing of open aperture positions, a complete scan cycle must be accomplished at a refresh rate sufficiently fast enough that the human eye will not detect the scanning effect. It is generally accepted that a refresh rate of approximately 50 times per second is sufficient. This cycle rate must be maintained regardless of the total value of A.

Given that a large number of discreet angles is desirable and that total sequential-cycle frequency of these angles must remain at or above 50 Hz, the optical response time for a given shutter is somewhat demanding. The Aperture Optical Response Time T (in seconds) is as follows:

$$T = \frac{1}{2(r)}$$

Preferably, T should be as short as possible for a given material in order to prevent unwanted angular cross talk, which produces undesirable fogging or smearing of the image. T must be less than or equal to 1/r, and preferably less than 1/2r.

Consideration for Angular Resolution

When designing an implementation of scanning aperture holographic display technology of the present invention, an important concept to understand and utilize properly is that of Angular Resolution. The Angular Resolution (AR) for a given display refers to the total number of discreet angles encountered per unit length along the observer plane, at a particular observer distance.

Figure 3:
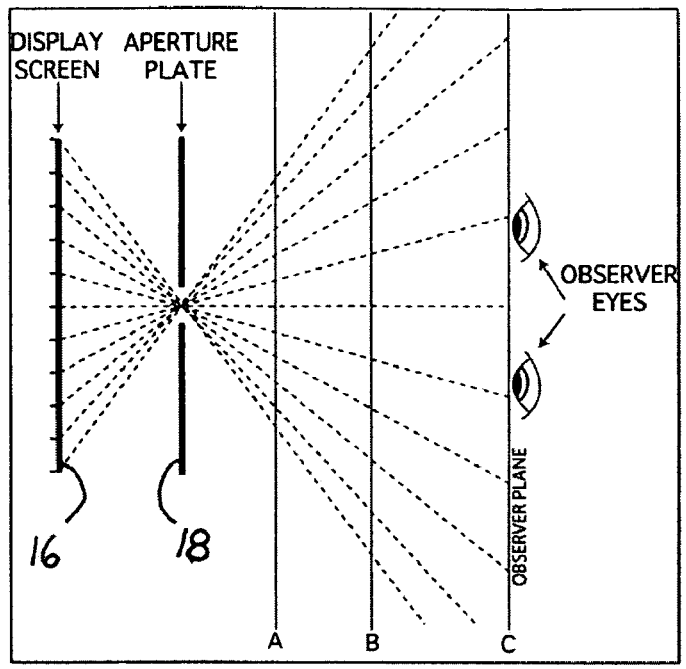
FIG. 3 is a plan view demonstrating the angular resolution considerations for the 3D display system according to an embodiment of the invention.
Figure 4:
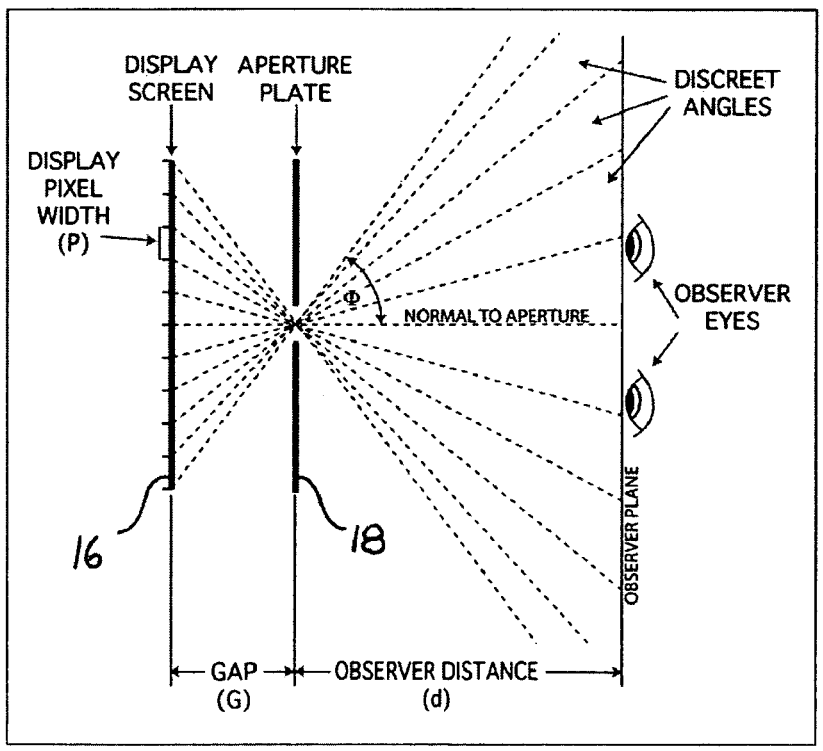
FIG. 4 is a plan view demonstrating the angular resolution considerations for the 3D display system according to an embodiment of the invention.

Referring to FIG. 3, discreet angles (separated in the Figure by dashed lines) radiate away from the aperture toward the observer's eyes. The observer's eyes are considered to be directly on the observer plane, which is parallel to the aperture plate. Notice the intersection of the discreet angles with observer planes at different distances, A, B, and C from the aperture plate 18; the total number of discreet angles per unit length of the observer plane decreases as the distance from the aperture plate 18 increases. It is also interesting to note that the observer eyes at the observer plane C encounter different discreet angles, and can thus perceive stereoscopic parallax (See FIG. 4). By shifting the head left or right (along a horizontal axis), the eyes will encounter new and different discreet angles, maintaining an adaptive and accurate parallax over a range of angles. Should the observer move too far from the aperture plate, or there simply be too few discreet angles, both eyes will fall within the same discreet angle. When this occurs, the observer experiences stereoscopic breakdown, at which point the image becomes a simple 2-D rendering. For this reason, it is important to configure the scanning aperture 3D holographic display system of the present invention to maximize angular resolution for a given range of observer plane distances.

The Minimum Angular Resolution at which stereoscopic separation is maintained can be calculated as a ratio between the minimum number of required angles for stereoscopic view (i.e., 2 angles), and the average separation between human eyes, accepted to be approximately 65 mm. Thus, the angular resolution was found to be close to 31, given in discreet angles per meter:

(2 discreet angles)/(65 mm between observer eyes)
=31 discreet angles/meter

This is the absolute minimum required for the observation of a 3-dimensional image over the full range of display angles. With a display set to this minimum, however, an image can be seen to 'jump' or 'slip' slightly when the viewer's eyes transition from one set of discreet angles to another. Much better results can be achieved by doubling or quadrupling the angular resolution encountered at a given observation distance from the aperture plane.

Consideration for Virtual Images at Different Depths, Regarding Angular Resolution:

The desired Virtual Display Depth Range should also be taken into account when structuring the angular resolution pattern for a scanning aperture display implementation. Virtual objects set in intersection or near the aperture plane make the most efficient use of angular resolution, and are least likely to encounter stereoscopic breakdown. Stereoscopic breakdown is most likely to occur in two broad situations: 1) The observer is near the screen and a virtual object is constructed to appear 'deep' behind the aperture plane; and 2) The observer is at a distance from the screen and a virtual object is constructed to 'protrude' a significant distance from the aperture plane.

The most successful remedy in both cases is to design for an increased angular resolution over the desired viewing range. It should be noted that the simplest way to increase angular resolution is to decrease the maximum viewing angle of the display. Notice in FIG. 3 that the angular resolution over the entire viewing range at a radial distance from the aperture is greatest near the extremes in viewing angle, and least in the middle. For displays with extremely wide viewing angles, this effect makes it inefficient to increase the angular resolution, as most of the increase occurs at the extremes of the viewing range.

Calculating Angular Resolution

Provided below is one useful method for determining the minimum angular resolution experienced by an observer moving through the entire viewing range at a fixed radial distance from a given aperture.

The Angular Resolution Measured Minimum (ARmin) can be found at a viewing position along the observer plane. (See FIG. 4).

$$ARmin = \frac{G}{dP}$$

The ARmin is useful when designing a system because it allows engineers to quickly identify angular resolution deficiency (being AR's less than 31 discreet angles per meter).

Visual Constraints with Scanning Aperture Hologram Displays

Figure 9A:
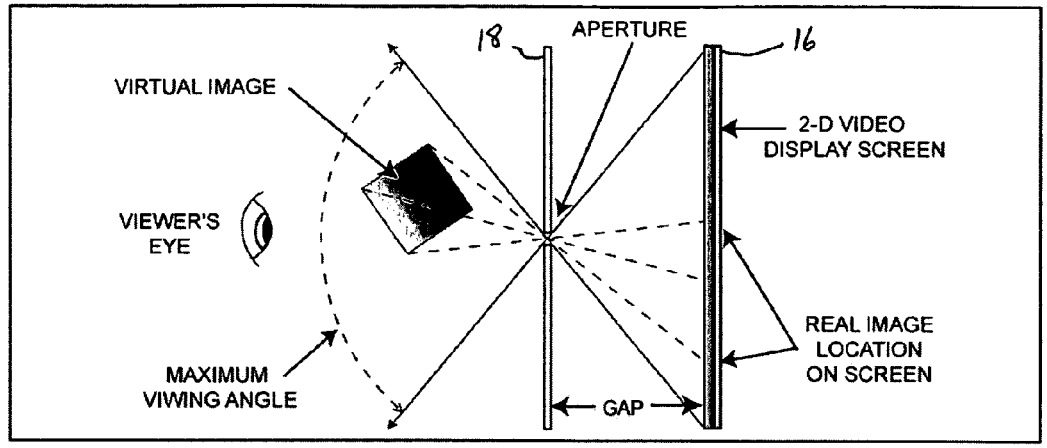
FIGS. 9a, 9b and 9c shows variations in the visual constraints of virtual images traced through aperture to real image.
Figure 9B:
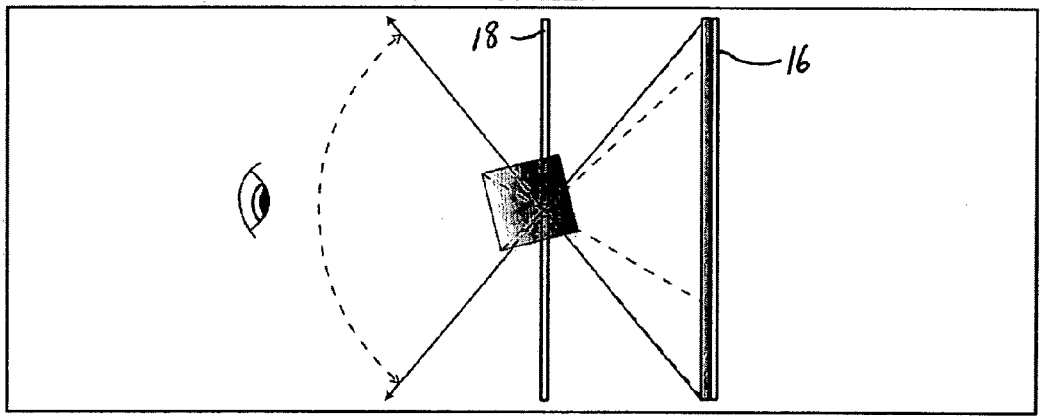
Figure 9C:
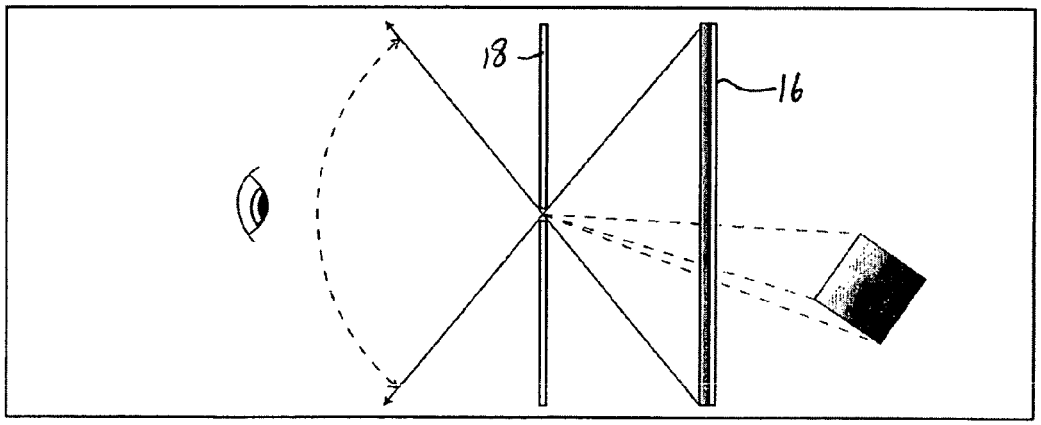

Objects displayed through a scanning aperture display device may be viewed over a wide range of angles by simply changing viewpoints by repositioning the head (eyes) in the real world. Objects presented on the screen can be mapped in such a way as to appear behind the plane of the screen, in intersection of the plane, as well as in front of the plane. (See FIGS. 9a-9c) The image is constrained in that plane of the screen fully defines the area in which the image may be formed. In other words, images seen on the screen may be seen to extend both behind and in front of the screen's surface, but no image can be formed outside the screen's edges.

Figure 10:
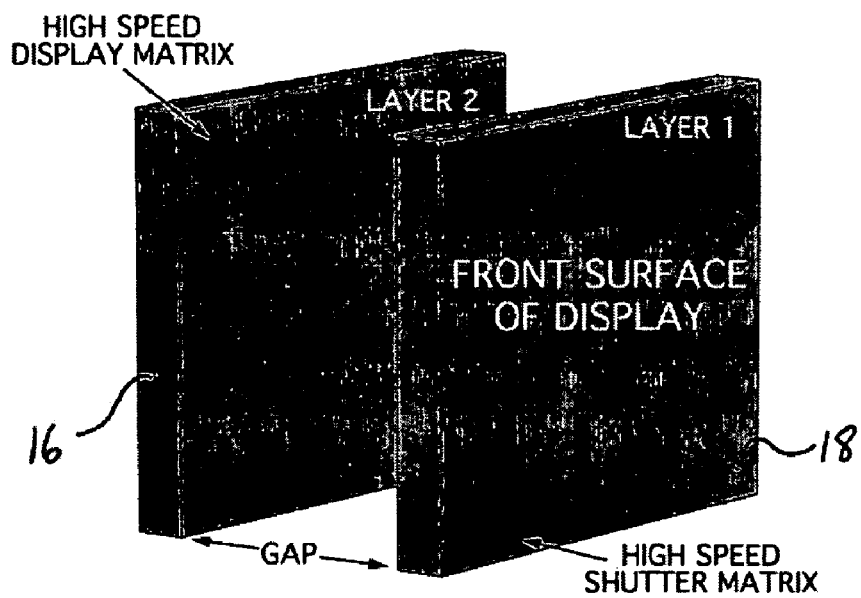
FIG. 10 is block diagram of the basic construction of the scanning aperture holographic display system according to an embodiment of the invention.
Figure 11:
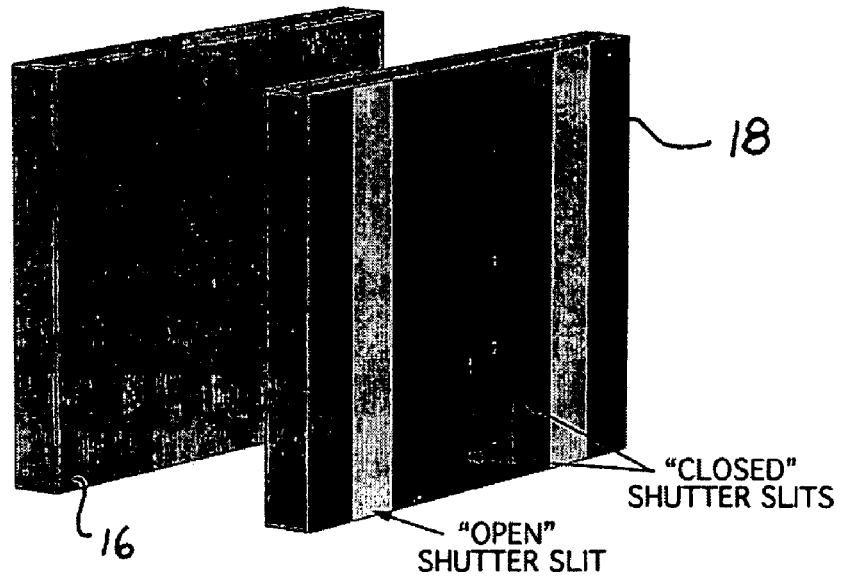
FIG. 11 is block diagram of the basic construction of the scanning aperture holographic display system according to another embodiment of the invention.
Figure 12:
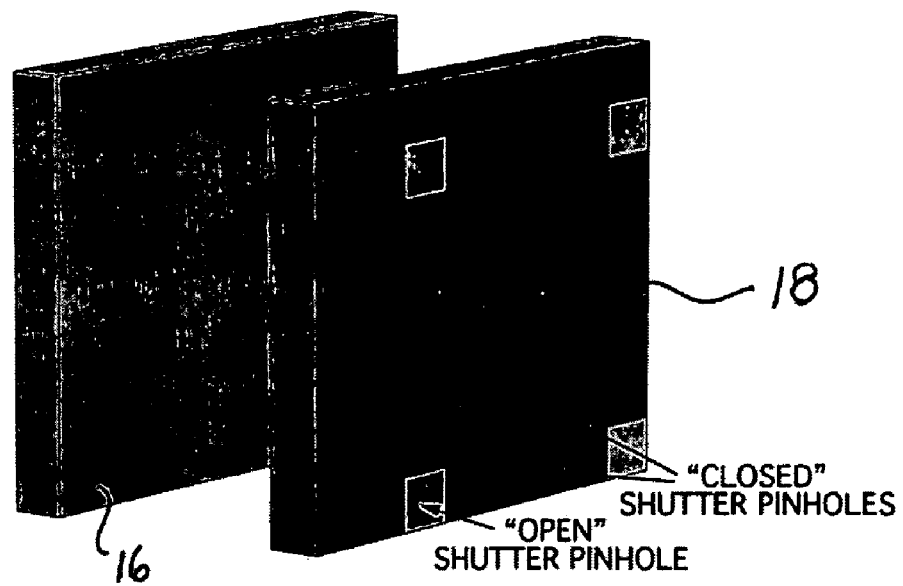
FIG. 12 is block diagram of the basic construction of the scanning aperture holographic display system according to yet another embodiment of the invention.

FIG. 10 shows as basic representation of the scanning aperture 3D image display system according to an embodiment of the invention. As shown, the system includes of a matrix of high speed shuttered apertures (Layer 1), i.e., aperture plate 18, a gap G of a specific length, and a high speed video display matrix (Layer 2), i.e., display 16. In one embodiment, the aperture plate 18 is a high-speed optical shuttering system, employing high-speed liquid crystal or other solid state optical shuttering technology. Its 'shutters' are numerous and are arranged as either narrow vertical columns (See FIG. 11) or as a matrix of fine rectangular windows (See FIG. 12).

As discussed above, a precisely maintained gap G separates the aperture plate 18 and the display 16. The gap G is preferably greater than the width of one 'shutter' and less than the entire width of the first aperture plate 18. Most preferably, the gap G will be in a range of 0.1 cm to 5 cm, according to various embodiments of the invention.

The display 16 is preferably a high frame-rate video display device, and may employ any of a variety of display technologies. Examples of these technologies would be: High-speed liquid crystal display technology such as Pi-Cell liquid crystal (Pi-Cell LCD) or Ferroelectric liquid crystal display (FLCD); Organic LED technology; Miniature LED technology, plasma, zero twist nematic LC; rear projection using multiple projectors, high speed FLCD or LCOS technology, or a DLP mirror chip (described below); or a hybrid projection system based on the combination of any of these technologies. Preferably, the pixels on the display screen are not wider than the width of any single 'shutter' on the aperture plate 18.

Figure 13:
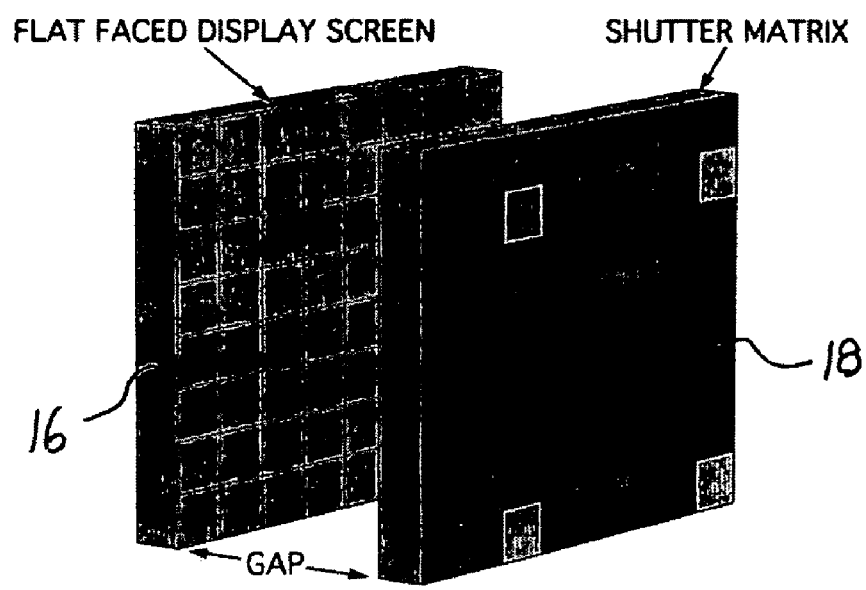
FIG. 13 is block diagram of the basic construction of the scanning aperture holographic display system according to a further embodiment of the invention.
Figure 14:
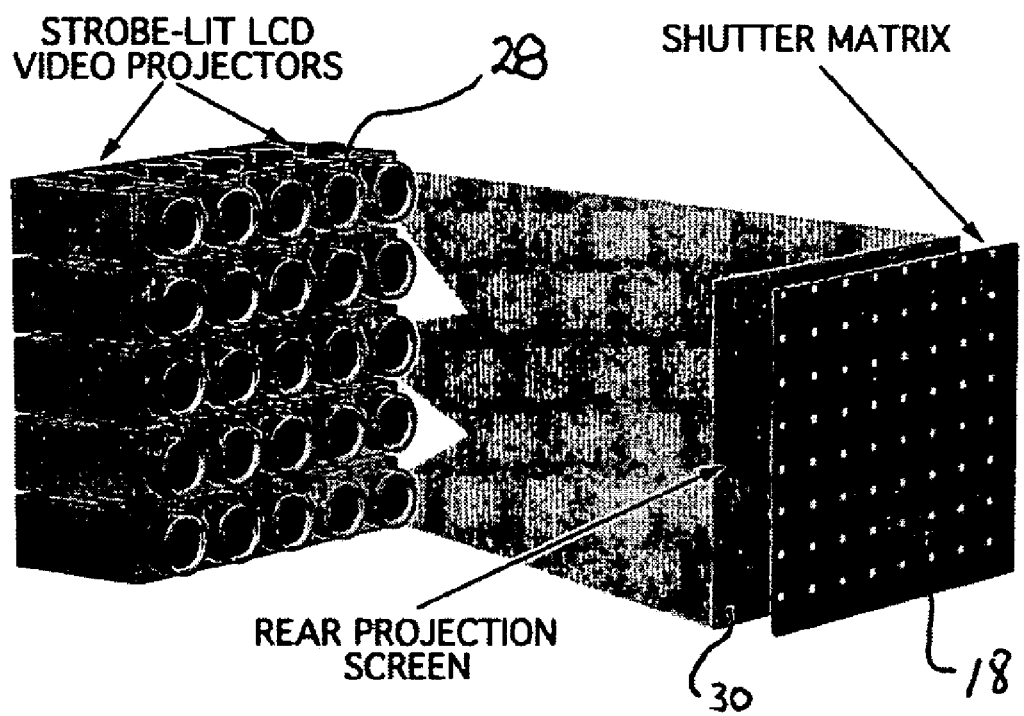
FIG. 14 is block diagram of the basic construction of the scanning aperture holographic display system according to yet a further embodiment of the invention.

FIG. 13 shows a flat faced display screen that can be implemented using any one of the plasma, Pi-Cell LCD, FLCD, LED, OLED or LCD display technology. FIG. 14 shows a rear projection hybrid system using multiple LCD video projectors back lit by sequenced strobe lights being used as an alternative to a single high-speed display screen 16.

According to one preferred embodiment, the display screen 16 is capable of producing a sustained display frame rate between 150 and 10,000 frames per second. A suitable example of such high speed video display screen used for the proposed purpose of parallax reconstruction in the 3D display system of the invention will use a Smectic C-Phase Ferroelectric Liquid Crystal as its electro-optic medium.

In accordance with one aspect of the invention, the scanning aperture 3D display device receives its input from a digital image source, such as a computer, disk array, or a solid-state data buffer. The device is electronically driven by specialized, self-contained driver circuitry. The driver circuitry is capable of formatting a 3D data input for holographic viewing in real time. Input file types may include common 3D codecs such as DXF, STL, LWO, XGL, and VRML. Input sources will vary according to application, and may be pre-rendered or rendered in real-time with the use of hardware rendering protocols such as OpenGL or DirectX, or any of a variety of systems, such as those used in dedicated videogame consoles. Applications include medical, industrial, commercial, scientific, educational, and entertainment related viewing systems.

Two-Axis System

A two-axis 3-D display system differs structurally from the aforementioned one axis system most noticeably in the shape of the parallax barrier active regions, here forward referred to as apertures. Each aperture is a transparent region of the 'aperture plate', which rapidly translates across the face of the aperture plate. In the one-axis system, the aperture is preferably vertical 'slit' with a width matching the width of pixels of the display screen, and a height running the entire height of the aperture plate. In a two-axis system, aperture dimensions will ideally match the respective dimensions of each pixel of the display screen. Further, the total number of active regions on the aperture plate will be less than or equal to the total number of pixels on the display screen.

Eliminating Frame Vignetting

Most commonly, the aperture plate and display screen sizes will be equal, but it may be desirable for some applications to extend the display screen's edges beyond the edges of the aperture plate, both horizontally and vertically. The effect will be to eliminate the otherwise inherent 'inset frame' effect seen around the edge of the one or two axis systems. This effect will cause a dark vignette to form at the edges of the screen when looking into the screen from off-normal angles. The apparent thickness of this vignette approaches the width of the gap G between the aperture plate and the display screen. For high-resolution displays of fewer than 100 discreet angles, the effect will be minimal. The effect will, however, become more noticeable if a large number of discreet angles is called for, or should a narrower maximum viewing angle be desired. (Both these conditions contribute to a widening of the gap between the aperture plate and display screen, and hence a thickening of the outer frame. Should one choose to eliminate the 'inset frame' effect, one should make the display screen wider than the aperture plate by a number of pixels equal to the total number of discreet horizontal angles to be presented, and taller than the aperture by a number of pixels equal to the total number of discreet vertical angles to be presented. The size-increased display screen is then centered behind the aperture plate, at the appropriate gap distance. If this technique is applied to a single axis system, the width of the display screen should be increased by a number of pixels equal to the total number of discreet angles, and the height may be increased by the same number of pixels. The display preferably will be centered behind the aperture plate.

Frame Rate, Discreet Angle Allocation, Compromised Views

Two axis systems require substantially more discreet viewing angles than single axis displays. The total number of discreet angles (A) required is equal to the product of the number of desired horizontal angles (h) and the number of desired vertical angles (v).

$$A=hv$$

The required display frame rate is given as the product of the total number of discreet angles (A) by the minimum fps required to overcome visible flickering (generally between 50 and 60)

$$r=50A$$

The 2-axis implementation may have a different number of vertical angles than horizontal angles. This is advantageous because, for an upright display screen, most user motion and depth perception occurs in the horizontal direction. The number of vertical angles should, however, be a reasonably large fraction of the total number of angles. For example, to place 100 angles along the horizontal axis and only 12 on the vertical axis requires 1,200 discreet angles, running at a frame rate of 60,000 fps. This is a very high frame rate, requiring an aperture optical response time of 16 microseconds at the longest. Also, the imbalance between the number of horizontal and vertical angles will be reflected by a very narrow maximum vertical viewing angle. This restricts the viewing volume in which a viewer's eyes must exist in order to perceive an uncompromised 3-D view. According to an aspect of the invention, the frame rate of the display device can be in a range 160-10,000 fps.

A compromised view of the display is any view from which the viewer's angle of view to some portion of the screen exceeds that portion of the screen's maximum viewing angle. When using an air-gap separation between the aperture plate and the display screen, a compromised view will resemble a fractured or repeated portion of the current image in all regions seen from an excessive viewing angle. When viewing images on a display having a solid-substrate type gap, a region viewed from too excessive an angle will appear to stretch slightly, beyond which the region will appear as a solid color. This is due to an internal refraction effect, which prevents the transmission of light from angles outside the refractive maximum of the substrate.

Scanning Patterns

Apertures in a two-axis system will be cycled through the total number of discreet viewing angles afforded by the display. To maximize the brightness of the image, it is desirable to have as many apertures open on the screen at a given time as possible. This number is found by dividing the total number of aperture plate pixels by the total number of discreet angles. More specifically, one can find the total number of vertical columns of open apertures by dividing the total number of horizontal apertures in the aperture plate by the chosen number of discreet horizontal angles. In the same way, the total number of horizontal rows of open apertures is found by dividing the total number of vertical apertures in the aperture plate by the chosen number of discreet vertical angles. If the chosen number of apertures are opened in vertical columns and horizontal rows, and distributed evenly, the result will be a grid of 'dots' or open apertures in the aperture plate. In one embodiment, each open aperture can be thought of as defining one corner of a rectangular region of scan.

Figure 15:
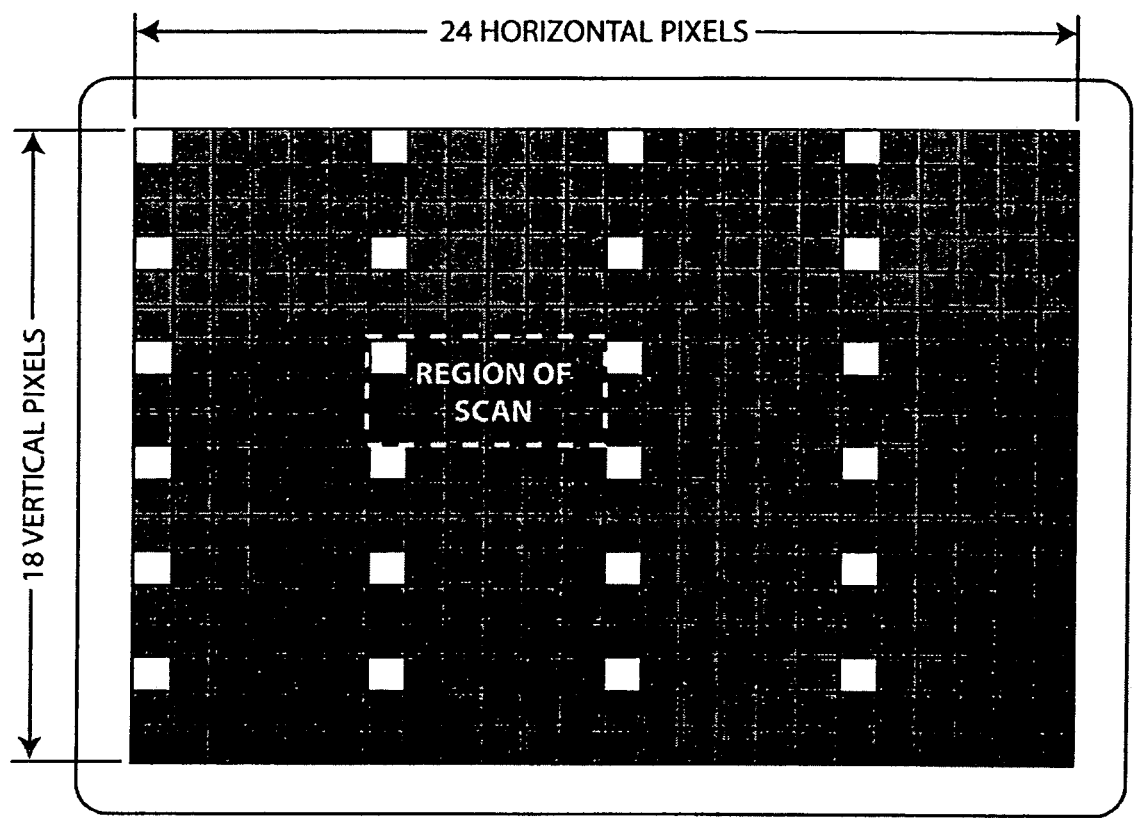
FIG. 15 is plan view of an aperture plate having a 24×18 resolution with discreet horizontal and vertical viewing angles for use with a 2-axis scanning aperture 3D display system according to an embodiment of the invention.

In operation, the aperture plate will translate these open apertures across each small region of scan, line by line, through a number of steps equal to the number of total discreet viewable angle before repeating. In FIG. 15, the display has 18 discreet viewable angles. The pattern of the aperture plate shown in FIG. 15 indicates a rectangular grid. This scanning pattern does not necessarily need to be aligned in this manner. Alternatively, the scanning patterns could be somewhat 'stair stepped', or could be completely randomized. The gridded "region of scan" configuration is simply useful organizational tool.

Viewing Volume of a Two Axis 3-D Display System

Figure 16:
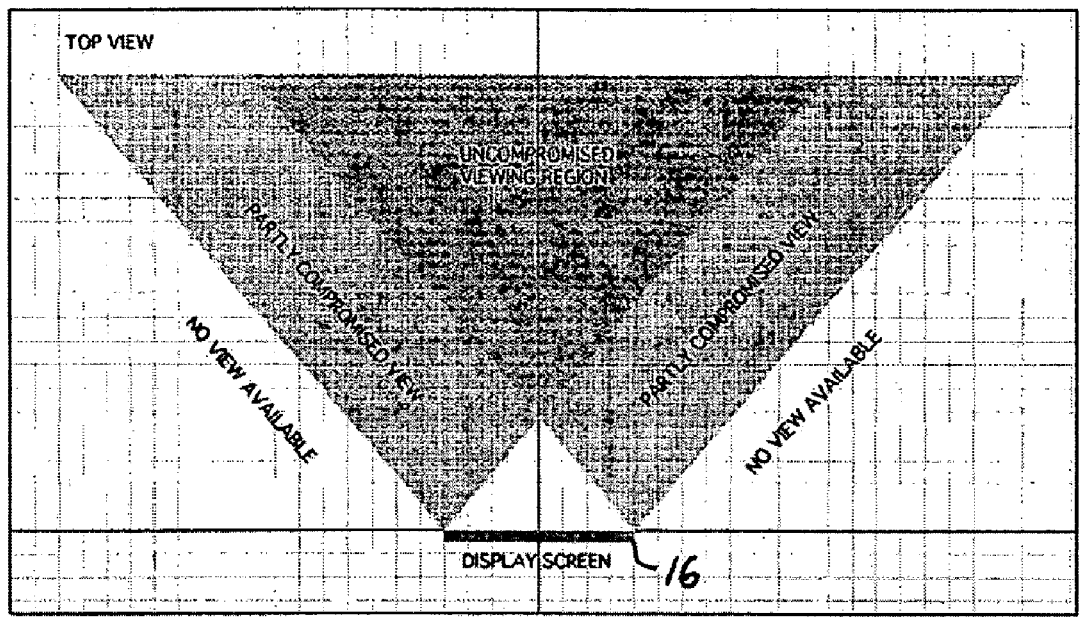
FIG. 16 is a top view graphical representation of the intersection of maximal angle projections from the most distant apertures in a 2 axis system according to an embodiment of the invention.
Figure 17:
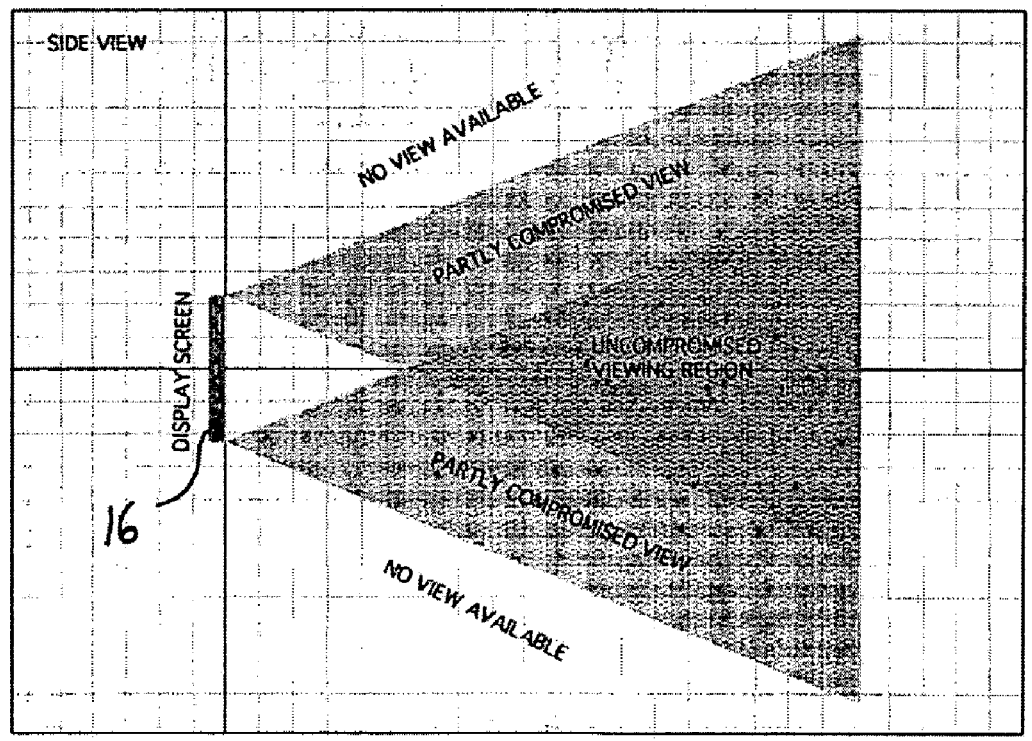
FIG. 17 is a side view graphical representation of the intersection of maximal angle projections from the most distant apertures in the vertical direction.

Each of the two axes of the display has a maximum viewing angle away from the normal. By projecting this maximum angle outward from either side of normals extending from the most separated apertures on the aperture plate, it is possible to determine the shape and location of the viewing area for the given display axis. FIGS. 16 and 17 demonstrate this concept. The display screen 16 shown offers a maximum horizontal viewing angle of 40 degrees, and a maximum vertical viewing angle of 22 degrees. The 3D renders of FIGS. 16 and 17, show the 3-dimensionality of the actual uncompromised viewing volume (region). Note that the fully uncompromised region is the volume of intersection between the horizontal and vertical viewing regions.

Figure 18:
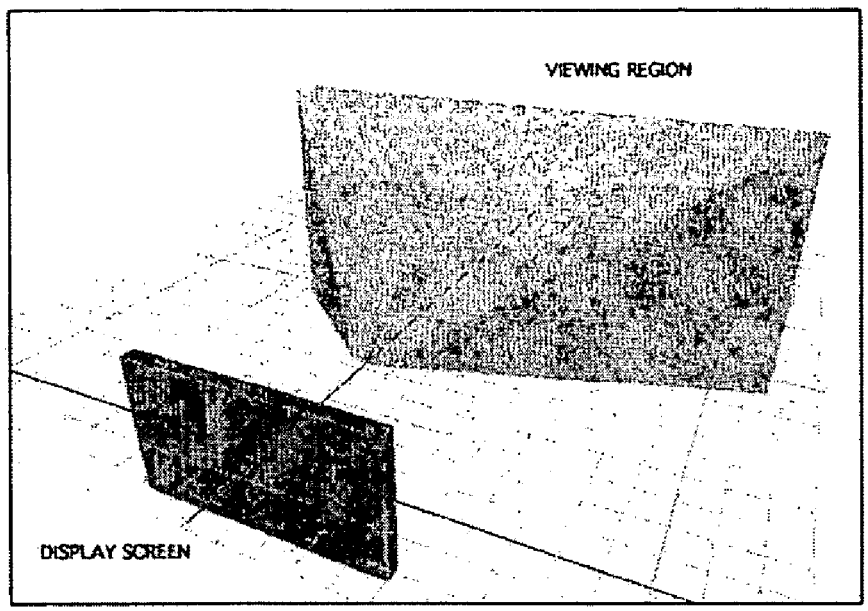
FIG. 18 is graphical view of the uncompromised viewing volume from behind the 3D display according to an embodiment of the invention.
Figure 19:
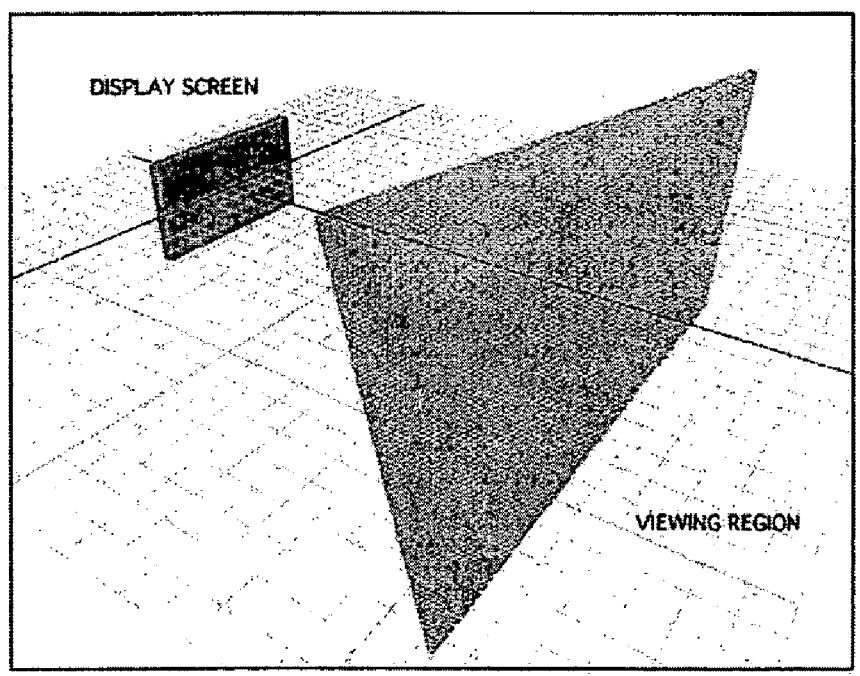
FIG. 19 is a graphical view of the uncompromised viewing volume from in front of the 3D display according to an embodiment of the invention.

Thus, it is readily understood that any two axis display based on dynamic parallax barrier time multiplexing will have some angular limitations for a given axis, and that, taken together, the total uncompromised viewing volume will have a pyramidal, or wedge-fronted pyramidal shaped volume extending away from the display screen and separated from the screen by a certain distance. The outermost boundary of the pyramid (the reclining pyramid's "base") is determined by the distance at which the screen's 3-D effect breaks down because of reduced angular resolution. FIGS. 18 and 19 depict the uncompromised viewing volumes from various perspectives in accordance with the two-axis 3-D display systems of the present invention. It should also be noted that changing the widths of the apertures in a given aperture plate with respect to the width of image columns in the image plate result in dramatic changes in the dimensions of the viewing volume, as well as the configurations of the angles with respect to the viewer. Generally speaking, an aperture plate having apertures slightly narrower than the image columns of the image plate allows for a more efficient use of angles, but limits the viewing volume to a narrower viewing region or 'eye box.'

Solid State System

As described in detail above, it is understood that three-dimensional images, having realistic angular parallax over a wide range of viewing angles, can be achieved through time-modulated image reconstruction. This can be accomplished by the use of dynamic parallax barriers (scanning apertures) in conjunction with a step-synced video display device separated at a defined distance or gap G. The following embodiments show the implementation of this technique which involve a Pi-Cell LCD or ferroelectric liquid crystal matrix (FLCD) as a dynamic parallax barrier, and a high speed video display (e.g., Pi-Cell LCD or FLCD) with a high-speed address bus. In practice, the display matrix is placed at a precisely maintained distance (gap G) from the face of the display. Such a system can, under optimal conditions, produce several discreet angles of parallax over a substantially wide range of viewing angles and can, under special circumstances, achieve color.

Under ordinary circumstances, however, it is difficult, if not impossible, to produce reliable color, brightness, and resolution at the high frame rates required by the 3D display system of the present invention using old CRT technology.

Figure 20:
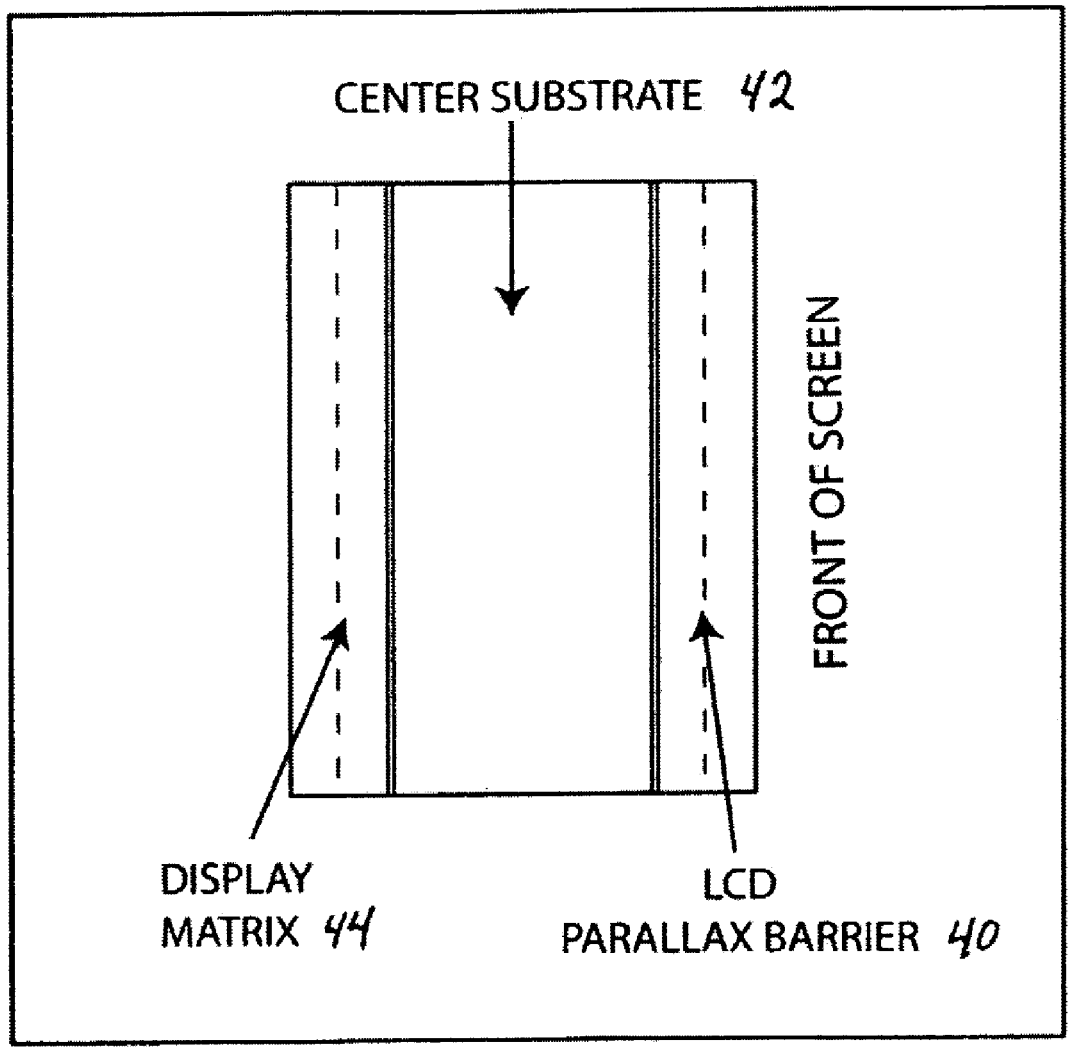
FIG. 20 is a schematic representation of a solid state 3D display system according to an embodiment of the invention.

FIG. 20 shows a solid state version of the scanning aperture 3-D display system according to another embodiment of the invention. This embodiment provides a method and structure for creating a truly solid-state, high resolution, three-dimensional color display device capable of realistic angular parallax over a wide range of viewing angles comprising, by way of example, a liquid crystal dynamic parallax barrier 40 (e.g., Pi-Cell LCD or FLCD), a transparent substrate of a specific thickness and index of refraction 42, and a high speed liquid crystal (e.g., FLCD or Pi-Cell LCD) or OLED display matrix 44.

The preferred embodiment is a shutter plate consisting of PI-Cell liquid crystal. The liquid crystal window is electronically converted into the transparent PI state upon activation of the computer's display system by means of internal driver electronics. The liquid crystal will be optimized for the maximum viewability of colored (e.g., RGB) light passing through from the CRT, typically having its first minima set for light of 550 nm wavelength. In operation, the PI-Cell liquid crystal will be electronically driven by means of an internal driver circuit in such a way that artifacts known to PI-Cell LC are minimized and contrast ratio at desired frequency is maximized. Such driving techniques may include, but are not limited to the use of a quasi-static waveform, or that of an alternating unipolar carrier waveform, as described by Lipton, Halnon, Wuopio, and Dorworth in "Eliminating PI-Cell Artifacts" 2000, which is incorporated herein by reference.

This solid state embodiment will have the following features: 1) no air gaps or open regions within its volume; 2) capable of producing images in realistic color and of high resolution, having pixel pitches between 1 mm and 0.25 mm; 3) capable of producing multiple viewing angles; more than 8; 4) includes a solid transparent substrate onto opposite faces of which are bonded a liquid crystal dynamic parallax barrier and a high-speed flat display matrix; 5) display is capable of a relatively wide viewing angle, maximally 90 degrees from normal for a given axis; and 6) display uses a solid-state display device capable of sustained high frame rates between 200 and 10,000 frames per second.

The display device is comprised of three solid layers. The outermost layer, facing the user, is a solid-state dynamic parallax barrier 40. This can be a high-speed LCD matrix (e.g., FLCD or Pi-Cell LCD), alternately, it could use Zero-Twist Nematic liquid crystal technology. The second layer is the central substrate 42, a preferably low-density transparent material of precisely chosen thickness and refractive index. The substrate can consist of fused silica glass, acrylic, or other optical material having a suitably low index of refraction. The third layer is a solid-state display matrix 44. This may be a transmissive-type display formed from high-speed LCD technologies, which can include ferroelectric, Pi-Cell or ZTN, or can be of an electroluminescent type, such as organic LED (OLED) or plasma. According to a preferred embodiment, FLCD or Pi-Cell is used for matrix 44.

The LCD parallax barrier 40, as mentioned above, will consist of a liquid crystal matrix over whose face is an array of discreet active regions which can, by the application of electrical current, switch from being opaque to transparent, and return to opaque with the removal or reversal of said electrical current. These active regions may, in one embodiment, be shaped like tall rectangles, having width equal to or slightly larger than that of an image pixel of the display matrix, and having height extending vertically from the lowest edge of the display screen's active area to the upper most edge. This configuration will allow the construction of images having realistic angular parallax, but only in the horizontal direction.

Alternately, the active regions of the parallax barrier can be rectangles whose height and width are nearly equal. This configuration will allow the display to produce images having angular parallax in both the horizontal and vertical axis. In operation, the active regions of the parallax barrier are rapidly activated in sequence so as to emulate several scanning slits or an array of pinholes. These virtual optical apertures are made to translate at a rate rapidly enough that the translation cannot be detected by the human eye.

The required optical response time for said dynamic parallax barriers is given as:

$$T=1/(50*v*h)$$

where T is the optical response time, v is the number of vertical angles to be presented, and h is the number of horizontal angles to be presented. The preferred embodiment includes a dynamic parallax barrier 40 that can sync to a video image from display 44 with a frame rate between 160 and 10,000 frames per second. To meet these requirements, the active material in the dynamic parallax barrier 40 (e.g., smectic C-phase ferroelectric liquid crystals) must have optical response times between roughly 3 milliseconds at the slowest and 5 microseconds at the fastest.

The number of transparent active elements that are open at any given moment during the parallax barrier's operation is given as by the following equations:

For slit-type configuration:

$$a=Rh/h$$

where a is the total number of open slits, Rh is the horizontal resolution of the display screen, and h is the total number of discreet horizontal angles to be presented.

For pinhole-type configuration:

$$a=(Rh/h)*(Rv/v)$$

where a is the total number of open slits, Rh is the horizontal resolution of the display, h is the total number of discreet horizontal angles to be presented, Rv is the vertical resolution of the display screen, and v is the total number of discreet vertical angles to be presented.

The transparent substrate 42 is positioned directly behind the parallax barrier 40, and generally comprises a single layer of transparent material of suitable thickness and refractive index. This layer acts, at least in part, as the structural base for both the dynamic parallax barrier and the display matrix layers. These layers preferably are bonded to the substrate layer by means of a transparent adhesive, such as an optical epoxy or resin. Other adhesive methods may include clear-welding using lasers having a specific bandwidth and absorbing dyes in the substrate or parts being bonded thereto that do not interfere with the optical properties of the substrate 42 (i.e., dyes capable of absorbing the laser light energy in the pre-determined bandwidth and in response to the absorption of the laser energy, completely bonds the two surfaces without any change in the optical properties of the bonded surfaces).

The substrate 42 preferably has uniform thickness, and refractive index over its entire area. The substrate may or may not polarize the light that passes through it. The substrate may or may not affect the color of the light that passes through it by means of dye or other subtractive chromatic filter.

Figure 21:
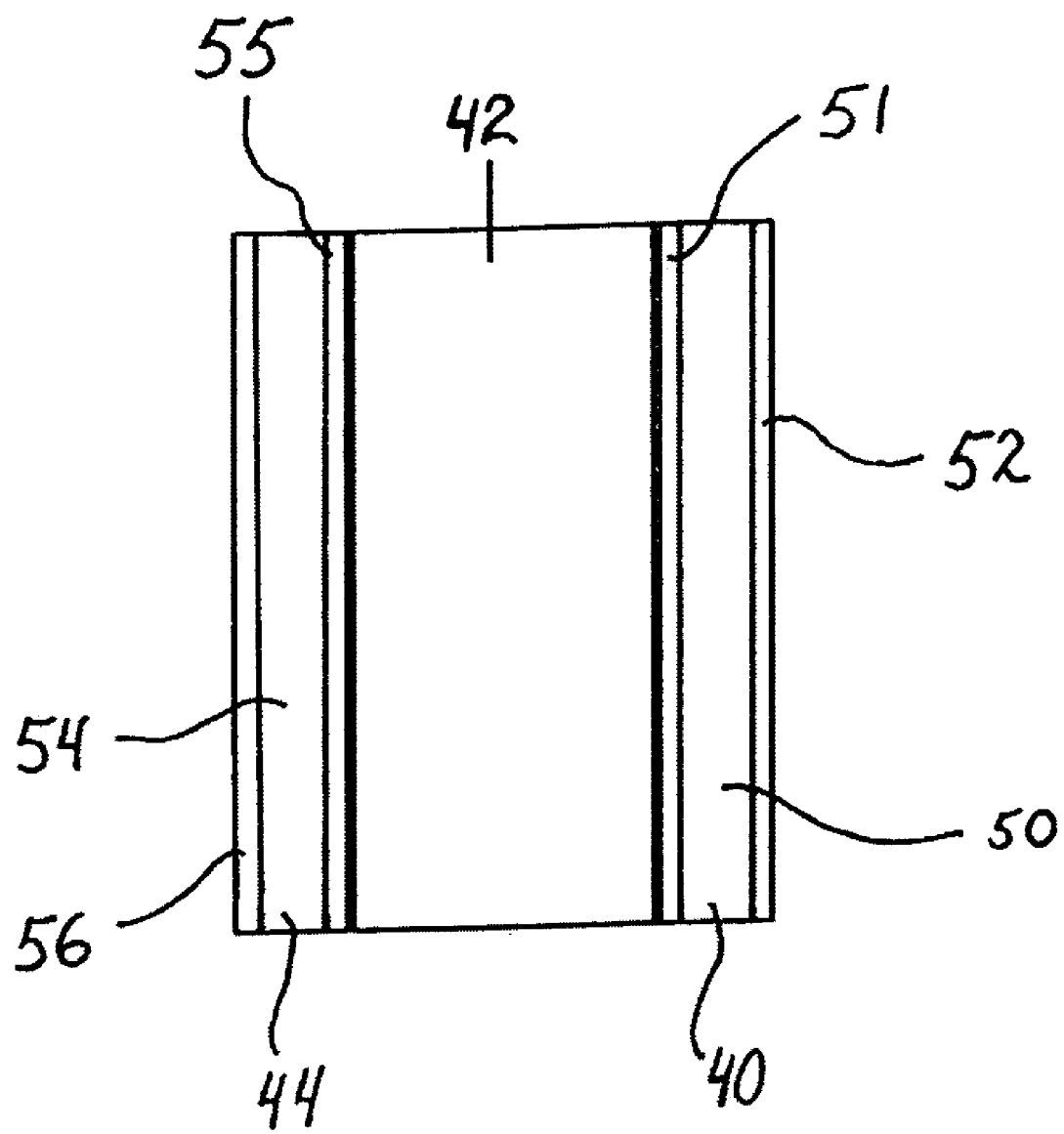
FIG. 21 is a schematic representation of another solid state 3D display system according to another embodiment of the invention.
Figure 22:
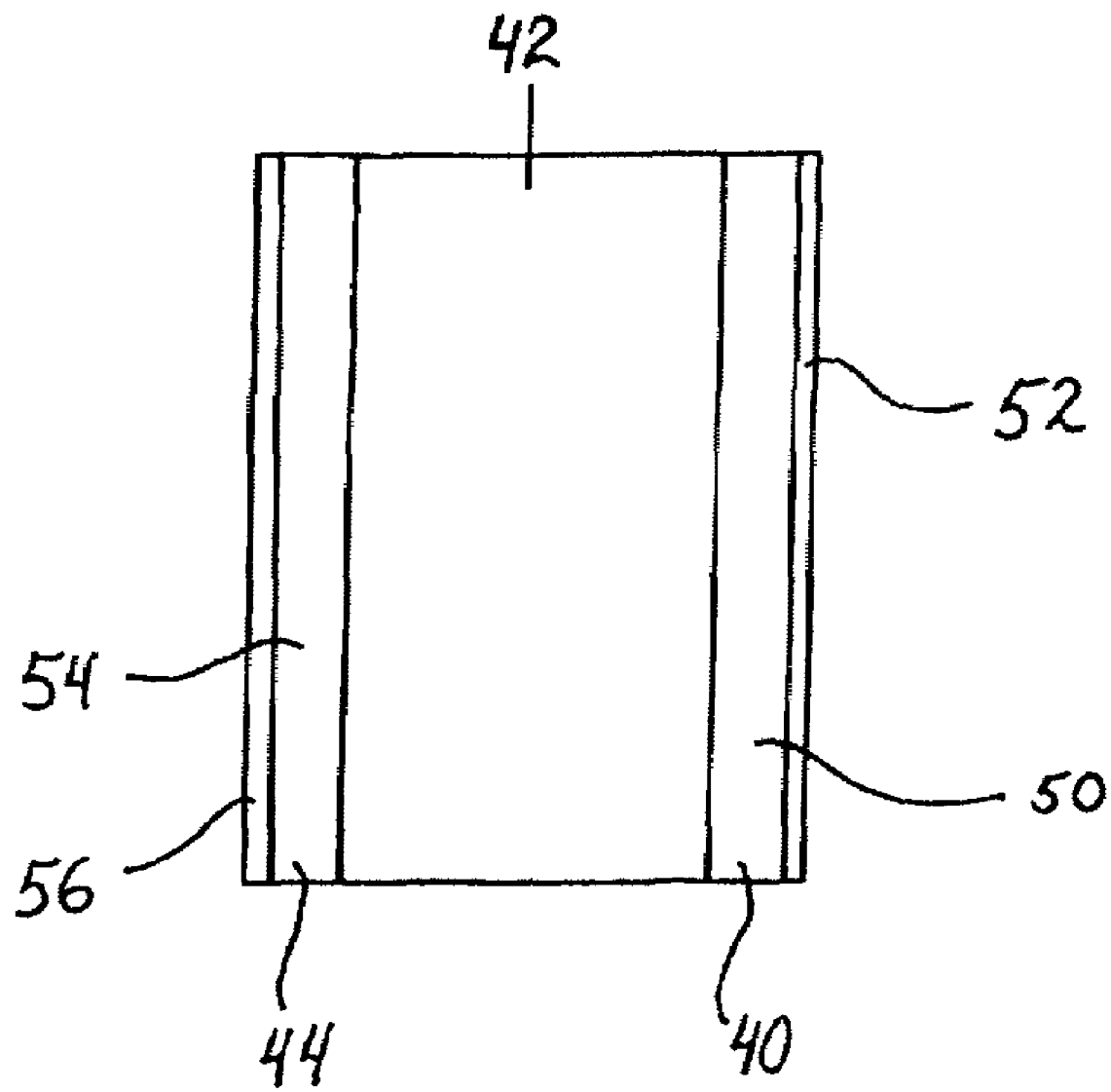
FIG. 22 is a schematic representation of another solid state 3D display system according to another embodiment of the invention.

According to other embodiments, the substrate 42 can be implemented as part of either the parallax barrier (aperture plate) 40 or the display 44, or both. FIGS. 21 and 22 show various different solid state embodiments of the present invention.

FIG. 21 shows the parallax barrier (aperture plate) 40 having three layers, two glass layers 51 and 52 and an LCD layer 50 between the two glass layers, while the display 44 also has three layers, two glass layers 55 and 56 and an LCD layer 44 disposed between the two glass layers. As shown, in this embodiment, the glass layer 51 of parallax barrier 40 is adhered to the substrate 42 in any suitable known manner, and the glass layer 55 of the display 44 is adhered to the substrate 42 in any suitable known manner.

According to another aspect of the invention shown, the respective glass layers 51 and 55 of the barrier 40 and display 44, respectively, are eliminated and replaced by the substrate 42. FIG. 22 shows an example of this embodiment where the display 44 and parallax barrier 40 are integrated with the substrate in one single piece structure.

Figure 23:
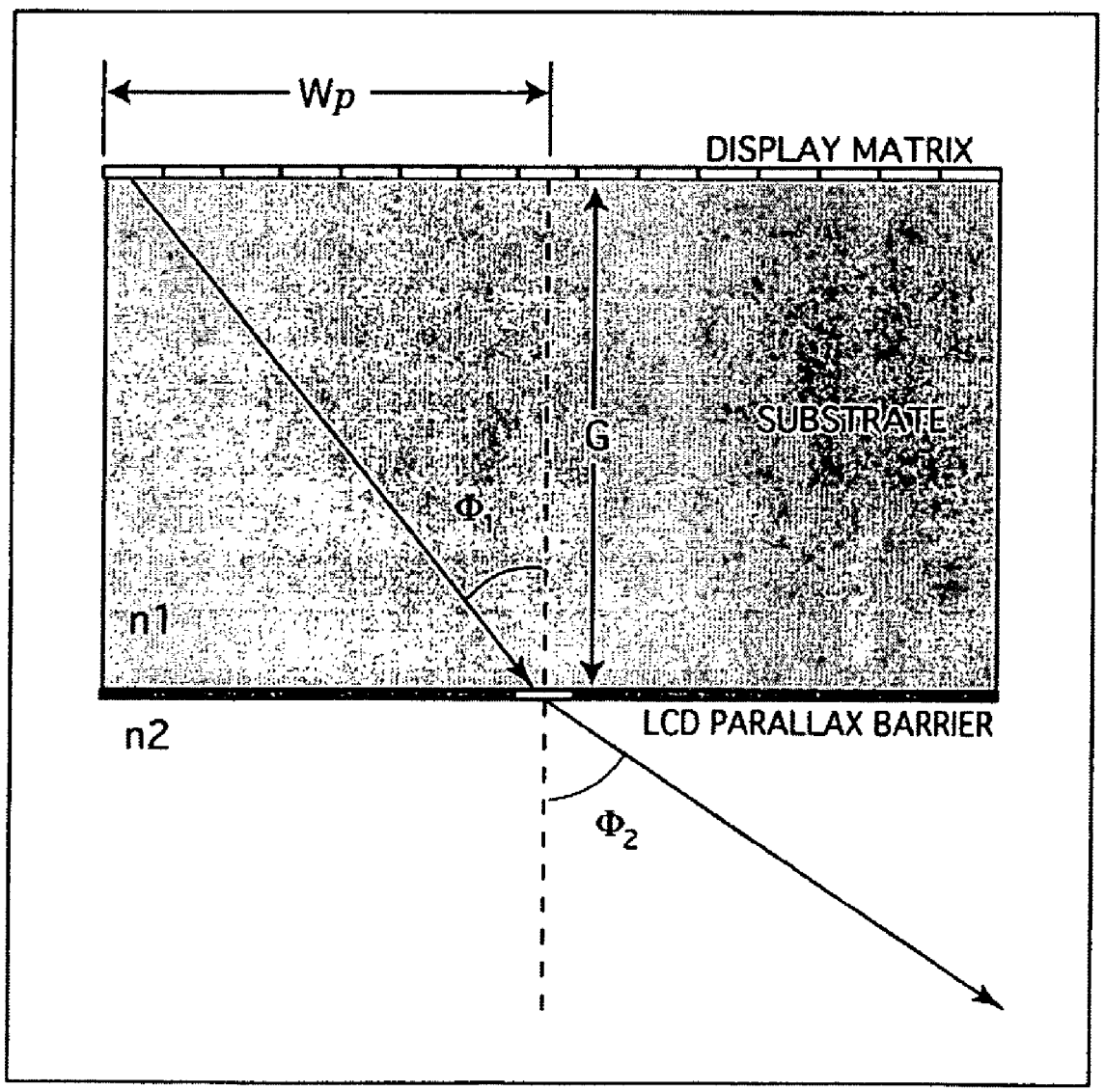
FIG. 23 is a graphic representation of the maximum viewing angle for a given substrate according to an embodiment of the invention.

FIG. 23 and the following set of equations describes the relationship between the thickness of the substrate 42, its index of refraction, and the maximum viewing angle away from normal for a given display 44.

FIG. 23 shows a cross section of an exemplary implementation of the invention. Notice that the maximum viewing angle away from normal ($\Phi_2$) is a function the partial projection width (Wp), the thickness of the substrate (G), and also the refractive indices of the substrate and viewing environment (n1, n2). The calculated value of Wp is given below:

$$Wp = PA/2$$

where Wp is the partial projection width shown in FIG. 21, P is the width of a given pixel on the display matrix, and A is the total number of discreet angles to be constructed by the particular display. The influence of refraction on the range of possible maximum viewing angles can be determined by evaluating the following equation for different values of Wp for a given substrate's index of refraction (n1):

$$\Phi_2 = \arcsin\left(\frac{n1 Wp}{n2\sqrt{Wp^2 + G^2}}\right)$$

where $\Phi_2$ is the maximum viewing angle away from normal, n1 is the substrate refraction index, Wp is the partial projection width, n2 is the refraction index of the viewing environment (most likely air) and G is the thickness of the substrate. It must be noted that the above equation describes the viewing angle with respect to the substrate's index of refraction, but that the absolute maximum viewing angle for a particular display will be intrinsically limited by the substrate's index of refraction. Beyond a certain maximum $\Phi_2$, the rays of light from the display screen will be subject to complete internal reflection within the substrate. The above equation was evaluated for several candidate optical materials with the following results:

| Material | n | Degrees Max. Viewing Angle |
| --- | --- | --- |
| Fused Silica | 1.46 | 42 |
| Acrylic | 1.49 | 41 |
| Optical Glass | 1.51-1.81 | 41-32 |
| Polycarbonate | 1.59 | 38 |

From the above data, it becomes clear that lower n values for a given substrate material result in a greater maximum viewing angle. By selecting the proper substrate material, it is theoretically possible to create displays with maximum viewing angles of greater than 45 degrees. Even an angle of 40 degrees from normal (80 degrees total viewing angle) is acceptable for most applications, and is acceptable for viewing by multiple persons.

The thickness of the substrate will remain relatively thin for displays of standard video monitor resolution and relatively moderate number of discreet angles. With a pixel pitch of 0.3 mm and 100 discreet angles, the substrate will most likely be under 2 cm thick. For higher numbers of discreet angles, the substrate becomes thicker, but not unmanageably so. An extremely high angle display capable of reconstructing 500 discreet angles, having a pitch of 0.3 mm will require a substrate roughly 8 cm thick. Most practical embodiments, however, will fall in the 50-150 discreet angle range, and will be less than 2 cm thick. A minimum thickness 3-dimensional display, capable of reconstructing just 8 discreet angles, and backed by a display with 0.25 mm pixel pitch, only requires a substrate thickness of 2 mm.

It should be noted that, especially in the case of small to moderate numbers of discreet angles, and for display systems of very small thickness, a precisely maintained separation between the parallax barrier and display matrix is critical. The use of a transparent substrate is the most practical method for setting and maintaining such a geometrically perfect separation and alignment.

The high-speed display matrix 44 is the back most layer in the solid state 3-dimensional display system. It is comprised of roughly rectangular pixels, having height nearly equivalent to width, as in a standard LCD screen. In a liquid crystal embodiment, the display screen preferably would employ either Pi-Cell LC, high-speed ferroelectric liquid crystal, or moderately high speed Zero-Twist Nematic liquid crystal technology, or any of a variety of other suitably fast bi-refringent liquid crystal materials (e.g., smectic C-phase ferroelectric liquid crystals). The display will employ commonly practiced techniques for implementing full color production.

In one electroluminescent embodiment, the display matrix comprises one or several layers of organic light emitting polymer. The matrix is capable of producing any of a broad spectrum of colors of light from any of its pixels, and is capable of maintaining the high required frame rate. A third technology is that of plasma display, where an array of electrodes causes a gas to emit light, illuminating a matrix of fluorescent segments. This method can theoretically produce the required frame rates, but is least desirable because it requires expensive encapsulation techniques and is somewhat more fragile than the other two.

The pixel pitch of the high-speed display is comparable to standard video displays, between 1 mm and 0.25 mm in size. The pixel and parallax barrier pitch will ideally exist within this range, as images become highly course when pitch exceeds 1 mm, and unwanted chromatic diffraction effects become apparent at pitches below 0.25 mm.

The screen is capable of refreshing the entire surface of its display once for each configuration of the dynamic parallax barrier, between 150 and 10,000 times per second. In operation, the refreshing of the display screen and the parallax barrier are synchronously locked to one another.

The three-dimensional display screen is innately backward compatible as a standard monitor. In standard monitor mode, all of the active regions in the dynamic parallax barrier 40 are made to be transparent, while the rear display screen 44 is made to display video at a standard frame rate, at standard resolution.

The solid state system disclosed in FIGS. 20 and 21 can be manufactured using existing glass-on-glass processes used to produce standard LCD panels of large size. This enables the manufacture of large sized high-resolution screens.

During manufacturing, the parallax alignment of the display screen (matrix) 44 is intrinsically maintained by the system, as the dynamic parallax barrier 40 and display screen 44 are firmly bonded to the substrate 42. The substrate, being of a precise thickness, rigidly maintains the separation regardless of vibration, pressure differential, or flexure.

An advantage to the solid state embodiment herein is that the system is compact and robust. Since the system of the preferred embodiment incorporates a flat-panel display matrix comprising high-speed liquid crystal technology (e.g., Ferroelectric, Pi-Cell or Zero-Twist Nematic) or an electroluminescent display system (e.g., OLED, LED), the complete display system is not bulky or susceptible to magnetic interference or vibration like CRT technology.

One other possible application of the solid substrate approach is the use of an aperture plate (e.g., Pi-Cell LCD or FLCD) attached to the front of a transparent substrate, having a light diffuser attached to its rear surface in place of the direct display screen. This diffuser could then act as a rear projection screen, working in conjunction with a DMD, LCOS, or other high speed video projection system. The device would benefit from the added stability of the thick substrate, and the potentially lower costs of rear projection.

Some of the unique attributes of the proposed solid state flat-screen scanning aperture hologram (3D) display device of the invention include: 1) No spinning mirrors prisms or moving parts involved in the imaging system; 2) No lasers utilized to produce holograms; 3) Displays images in full color; 4) Requires no special glasses for viewing; 5) Produces realistic angle-dependent perspective, i.e., the image is a true hologram; 6) Can accept a standard digital input; is compatible with a variety of devices; 7) Can emulate other display technologies: stereoscopic, 2D standard display; 8) Images are not bounded like a volumetric display; can appear to protrude from display; 9) Requires a lower signal bandwidth than other developing holographic display systems; 10) Offers more flexibility of design in terms of size, viewing angle, and brightness than other developing holographic display systems; 11) Utilizes well-understood electro-optical phenomenon, does not rely on quantum-effect based technology; and 12) Can be produced at lower cost than laser-based systems, using existing fabrication techniques.

Other Possible Uses and Variations:

The 3D display device of the present invention can be used to display data from medical imaging devices such as NMRI, CAT scan, PET scan, and 3D Ultrasound. In practice, it would enable doctors to actively view a patient's organs in a realistic 3-D perspective.

The device can also be used as a display for industrial design applications, including automotive and product design. A wall-sized variation of this display could enable engineers to inspect a life-sized model of a new car before it is physically constructed. Multiple display screens may be arranged to form a cylindrical display arena, which would enable viewers to walk around a displayed hologram. As an alternative to this arrangement, a horizontal display table will enable viewers to walk around smaller scale holograms. Such displays could be combined with manual input devices using haptic technology to let engineers interact directly with holographic images. Smaller displays could be used by product developers to demonstrate project designs to clients. Wall mounted holographic display could be used for advertising, or as 'virtual windows' in otherwise cramped apartments. Wall mounted displays may also be very useful in educational institutions such as museums and art galleries, as they could reproduce the appearance of various precious artifacts, works of art, extinct animals, or other difficult to observe items.

Those of ordinary skill with recognize that various hardware may be utilized for different component parts of the disclosed 3-D display system without departing from the spirit of the invention. The following represents an exemplary list of equivalent structures that may be implemented into the system of the invention:

I. Scan Type

Scan type describes the means by which an aperture is rapidly translated across a viewer's field of view. This is necessary to the formation of complete images from otherwise pinhole or slit like apertures.

A. Solid State scanners are the most desired class of aperture scanners for commercial scanning aperture holographic displays. Their key distinction is they use not moving parts in the process of aperture translation.

1. Flat solid-state scanners are comprised of a dense matrix of liquid crystal or similar light shutters that can be rapidly made to shift between opaque and transparent. They can most easily used to create rectangular flat-screen type displays desired by the computer industry. Pi-Cell LCD's and Ferroelectric liquid crystal optical shutters have been found to have a suitably fast response time.

2. Curved solid-state scanners describe a system identical to the flat type scanner above, but built on a curved or flexible substrate. This type may be more difficult to achieve, but can be used to create cylindrical or otherwise unusually shaped displays. Applications include immersive VR environments, public display systems, and 'artificial transparency' whereby an opaque object is clad with holographic displays and made to appear transparent.

II. Aperture Type

A. Slit type apertures consist of a vertical aperture with the height of a given display screen and generally having the width of a similar size as the width of a single pixel of the display screen. This is the simplest scanning aperture configuration, requiring the lowest frame rate and electronic signal bandwidth. It is limited in that it only produces horizontal perspective. (A viewer may view the left and right side of a holographic object, but will not be able to see the top or bottom of the object.) This display is well suited for low cost systems used with gaming, entertainment, and design related applications. It may also be perfectly suitable for industrial, medical and military applications. In all configurations, the screen must be oriented upright to the viewer, as a computer monitor or easel, as opposed to a tabletop.

B. Pinhole type displays' apertures are small and rectangular or radially symmetric in shape. This class of display type is capable of producing accurate perspective in both the horizontal and vertical directions. Though this requires up to the square of the slit-type displays' bandwidth, such displays are suitable for table type systems. Table type systems consist of a display oriented parallel to the plane of the floor. They may be viewed from anywhere around the display, and are generally seen by looking down onto the display's surface. Such displays are ideal for engineering, design, and architectural applications. They may also be useful for certain medical applications such as virtual or telepresence surgery. Military applications may include tracking troop movements above a three-dimensional satellite map of the battlefield. Entertainment systems include arena type displays for viewing sporting events from many different angles, as game pieces on a table.

III. Display Type

A. Direct display screens in scanning aperture displays are display systems whose active elements are placed directly behind the aperture plate, as set off by the gap. This class of display is best used to thin-screen holographic displays, suitable for laptop computers and portable equipment. Display may be limited in frame rate, and hence in angular resolution produce because of the display technology's innate response time.

1. Plasma displays are capable of producing suitable fast frame rates and brightness levels, but are rather expensive. Plasma displays are generally a screen comprising a grid of electrodes within an encapsulated volume. The electrodes selectively cause the gas to fluoresce, emitting visible light or stimulating specific color phosphors to emit light.

Plasma displays are not as bulky as other types of displays and can be built as flat, thin screens, and have been shown to exhibit excellent color, and are capable of the required high frame rates. However, Plasma displays exhibit some limitations with respect to resolution, and still require a potentially fragile sealed glass enclosure.

2. OLED or Organic Light Emitting Diode technology is emerging as a highly efficient display technology. OLED comprises a matrix made up of cells of an organic electroluminescent material that emits light of a specific color when an electric current is applied. Such displays may be capable of excellent brightness and color and power conservation.

OLED display matrices promise thin, flexible, color display screens that are capable of both high resolution and fast frame rate. OLED displays are currently being incorporated into small portable devices because of their power efficiency and high-viewing angle characteristics. OLED is, perhaps, the natural direction toward which future displays will tend 4. LCD or Liquid Crystal Displays are a matrix of small cells containing crystal particles in liquid suspension and which are re-oriented by an electric field, causing a shift in polarization, which switches light passing between a pair of polarizing filters.

LCD technology is the natural choice for portable high-resolution color video display systems. They have a low power requirement, are naturally very flat in construction, and are manufactured by a wide industry base, making them relatively inexpensive. Standard TFT LCDs are typically limited in their optical response time, which is typically in the range of 1 to 200 milliseconds or longer. This switching rate is not high enough for use in a Scanning Aperture 3-D display system, which optimally requires optical switching times well below 1 millisecond.

This is generally true of most families of liquid crystal materials. There are, however, some classes of liquid crystals that are well-suited to high frame-rate operation, including Pi-Cell Liquid Crystals and Smectic C-Phase Ferroelectric Liquid Crystals. Pi-Cell Liquid Crystal Displays have optical switches with response times in the range of 500 microseconds. Smectic C-Phase Ferroelectric Liquid Crystals have demonstrated optical switches with response times ranging from 5 to 150 microseconds, or roughly three orders of magnitude faster than standard LCDs.

5. Ferroelectric LCD (FLCD) displays are perhaps the most suitable technology as it can be made to match the response time of the previously discussed solid-state aperture scanner. A more detailed discussion of FLCDs and their application to the present invention is discussed in greater detail below.

B. Rear projection type displays are suitable for lower cost displays that can be built to fit in cases similar in proportion to Cathode Ray Tube (CRT) video displays. They may also be initially the most economical way to produce the excessively high frame rates required for scanning aperture display systems.

1. High speed video projectors have already been developed for use in volumetric 3-D display systems, and may be configured to produce suitably high frame rates for scanning aperture holographic systems.

2. DLP or Digital Light Processing is an integrated circuit matrix of micro-electro mechanical mirrors used to redirect a strong light source to form an image on a display screen. Some DLP displays are rear projection based.

DLP projection systems offer the advantages of high brightness, excellent color, and high frame rate. They are most commonly used in high-resolution video projection systems, and are a proven technology. They are, however, somewhat expensive, and are innately a projection technology. This limits their use to larger format rear-projection and theatrical-type projection systems; they are not suitable for most portable or compact display applications, such as laptop computers.

3. Hybrid, or compound video projection systems use several lower frame rate projectors in tandem with shuttered outputs in order to produce a suitably high frame rate. This configuration may be unnecessarily complex to align and calibrate. The main advantage is that it utilizes already existing LCD or DLP technology.

Ferroelectric Liquid Crystals (FLC)

Like the more common classes of twisted nematic (TN) liquid crystal materials, the crystal suspension used in FLC displays exhibits a chiral, or twisted molecular orientation when mechanically and electrically unconstrained. In practice, though, a Ferroelectric Liquid Crystal Display (FLCD) differs from a standard TN or STN (Super Twisted Nematic) LCD in a few important ways.

Surface Stabilization

In the construction of an STN display cell, the liquid crystal suspension is sandwiched between two glass substrates that have been surface treated or 'rubbed' with a particular pattern that causes the suspension to align its chiral structure in an ordered way. The substrates can be separated by several dozen to several hundreds of microns, depending on the specific application and desired switching characteristics. Thus, there is some room for inconsistencies in the substrate separation.

In contrast, a ferroelectric liquid crystal suspension must be carefully surface stabilized to its glass substrate. It must be held to a thickness of 1 to 2 microns, which must be evenly maintained over the entire area of the display's active region. This separation is maintained by the introduction of small spherical, optically inactive, spacer particles of the desired diameter. This need for precision makes the production of FLCDs more expensive than standard TFT, and the displays are more susceptible to damage due to flexure of the glass substrate. These limitations, however, have largely been overcome by manufacturers.

Driving System

A standard LCD of the STN or TN variety may be driven either as a passive or active matrix display. Passive displays have electrodes running in the vertical and horizontal direction oriented on either side of the LCD suspension. Pixels of the LCD can be addressed by directly passing current between specific electrodes, which cross at specific regions. An inherent disadvantage to this addressing technique is that, as the number of pixels to be addressed increases, the contrast ratio between activated and not-activated pixels diminishes. This limits passive matrix displays in both their resolution and their optical response time. Larger, color STN displays commonly make use of an active matrix addressing system which uses thin transistor film technology (TFT). In a TFT addressing scheme, each pixel of the LCD is backed by one or a few transistors that are integrated directly with the glass substrate of the screen. The transistors act to amplify and switch signals sent through the bus grid to specific pixels, greatly enhancing the contrast of the overall display. The frame rates of STN LCDs are high enough to display full motion video with minimal lag.

A Ferroelectric LCD can, in theory, operate in the passive matrix mode at extremely high resolution without suffering the contrast limitations inherent in TN or STN technology. This makes it potentially less expensive to produce because it does not require the expensive and complex deposition of a TFT matrix. As an added advantage, an FLCD is free of the cyclic flickering that can be found in STN displays run at too low a frame rate. This is so because FLC maintains its optical state once set, allowing each pixel to act as a kind of direct memory until it is refreshed for the next incoming frame. By way of example, the Canon 15C01 FLCD operates flicker-free with a passive matrix at standard television refresh rates.

Duty Cycle

STN or TN LCDs have duty cycles at or near 100%, meaning that each optically active region can be operated in a desired mode (activated or not) without the need for a special reset process. An activated region becomes deactivated by simply removing the electrical field from the electrodes in contact with that region.

FLCD is somewhat unusual with respect to duty cycle. Because the ferroelectric liquid crystal has a state memory, it must be electronically reset to a state (it does not return to an 'off' state when current is removed). Additionally, it is harmful for FLCs to be exposed to a net direct current over time. Simply put, for every period of time an FLC is given a positive charge, a negative charge must be given to that region for an equal amount of time. This relationship can be described as a voltage-time product balance, where the product of voltage and time for a positive charge must equal the product of voltage and time for a negative charge. It can also be described as a 50% duty cycle, saying that half of the FLC's cycle can be used towards image formation, while half is required to maintain the liquid crystal. FLCDs are typically run through several hundred to several thousand cycles per second. There are a variety of techniques employed to deal with the inherent 50% duty cycle of FLC in the formation of a light-switch or a display screen. The main methods are as follows:

1) Voltage-Time Product Balancing—The time spent in the recycling-state of the FLC is such that it is less than the desired display state, and the voltage spent in the shorter period of time is inversely increased so that the time-voltage product is maintained. This allows the contrast to be maintained, and also allows for the 50% duty cycle.

2) Dual Layer Approach—two FLCs are layered, one against the other. Each maintains a 50% duty cycle. A pixel of the screen is made to be opaque by selectively rotating the phase of the duty cycle of a pixel in one of the layers in the FLC. In this way, a constant contrast can be maintained, though the elements of the display are continuously reversing their states.

3) Backlight Modulation—The backlight behind an FLCD can be rapidly modulated in brightness so that it illuminates the screen only during the appropriate time in the FLC refresh cycle. This approach requires a backlight capable of rapid modulation, such as an LED or strobe light.

Color

The most common approach to displaying color with a standard STN display makes use of a deposited patterned layer of dye. Each LCD pixel can thus transmit a single color, red, green, or blue. Pixels are arranged in triads, which are coordinated in their emission to mix these three primary colors into a perceivable total spectrum of color. This is known as a spatially modulated color approach, and by way of example, is utilized by Canon in their FLCD monitor. A less common approach, often used with higher-speed, is the time modulated approach. Three or more elementary colors of light are cycled over a brief time period behind the LC matrix. The matrix consists of simple light-valves, which are then made to transmit the appropriate color by opening only during the appropriate time of the color cycle. This approach, in theory, can yield a display with three times the resolution of a spatially modulated approach. A modulated backlight, however, is difficult to create for display screens of large size and brightness.

Grayscale

Grayscale performance with FLC has its own separate set of considerations. Unlike STN type displays, which can directly achieve gradation based on the applied voltage, FLC is typically high-contrast or nearly binary in this respect. In order to simulate a multi-value transmissive effect, FLC cells can be time-voltage product modulated, or, in a multi-layer system, can be refresh-cycle-phase modulated. It is also possible that some combination of these techniques may be optimal for the desired application.

Temperature

Liquid crystals of the Twisted Nematic type will function over typically a wide temperature range. It is not uncommon for a TN display to have an operating temperature ranging from −15 degrees to as high as 99 degrees Celsius. FLC, however, has a much narrower operating temperature range. FLCs manufactured by Boulder Nonlinear, in Colorado, have an optimal operating range from 20 to 30 degrees Celsius. Canon, however, has widened the operating temperature range of its FLC to be from 15 to 35 degrees Celsius. Even without an extended temperature range, FLC will function normally in standard room-temperature environment, but may experience a reduction in performance from moderate temperature variances.

According to one preferred embodiment of the scanning aperture 3-dimensional display device of the invention using FLCD; 1) The FLCD screen is capable of producing a sustained display frame rate between 160 and 10,000 frames per second; 2) The high-speed video display screen used for the purpose of parallax reconstruction in the present 3-D display system can use Smectic C-Phase Ferroelectric Liquid Crystal as its electro-optic medium; and 3) The FLC will be surface stabilized between two large-format glass substrates with a total surface area greater than 16 square inches. Maintenance of substrate separation will be accomplished by means of particulate spacers of known diameter, placed between substrates, and surrounded by the FLC suspension.

In the case of the use of a solid central substrate in the Scanning Aperture 3-D Display System (see FIGS. 20-23), the FLC will be stabilized directly to the glass of the thickened center substrate. This configuration offers the following advantages:

1) Simplified overall system design, eliminates unnecessary glass layers;
2) Allows for perfect geometric alignment of FLCD with respect to front-layer aperture plate; and 3) The thickened center substrate (up to 2 cm thick) provides excellent structural support for the somewhat fragile FLC;
4) The FLC achieves color through the spatial modulation technique: A deposited layer of dye is patterned in front of or behind the active FLCD elements. Each pixel can thus transmit a single color, either red, green, or blue. Pixels are arranged in triads, which are coordinated in their emission to mix these three primary colors into a perceivable total spectrum of color. This is desirable over the use of the time-modulated technique because the time dimension will be utilized for the purposes of display-angle multiplexing;
5) In order to simulate grayscale, FLC cells can be time-voltage product modulated, or, in a multi-layer system, can be refresh-cycle-phase modulated. Some combination of these techniques may be optimal for the desired application.
6) The Ferroelectric Liquid Crystal is maintained at a 50% duty cycle. It achieves suitably high contrast by means of time-voltage product balancing, and/or by the use of multiple layers of FLC.
7) The 3D display will operate at room temperature with no special considerations made for the temperature range of the FLCD. Alternately, if the 3D display device is required to operate at low or varying temperatures, a temperature-regulated resistive heating element may be incorporated into the design of the FLCD enclosure. This would be most practical for outdoors or military applications.
8) The FLCD may be driven by a modified passive-matrix configuration. This configuration makes use of the FLC memory, which maintains the optical state of the FLC until the next refresh cycle. The bus system may be configured to allow for simultaneous addressing to multiple FLC cells, allowing for extremely high refresh-rates. The bus system may make use of TFT decoding electronics placed between columns and rows directly on the display screen substrates. Alternately, the column and row decoding electronics may be placed at the periphery of the display screen, or on a separate driver card.

Figure 24:
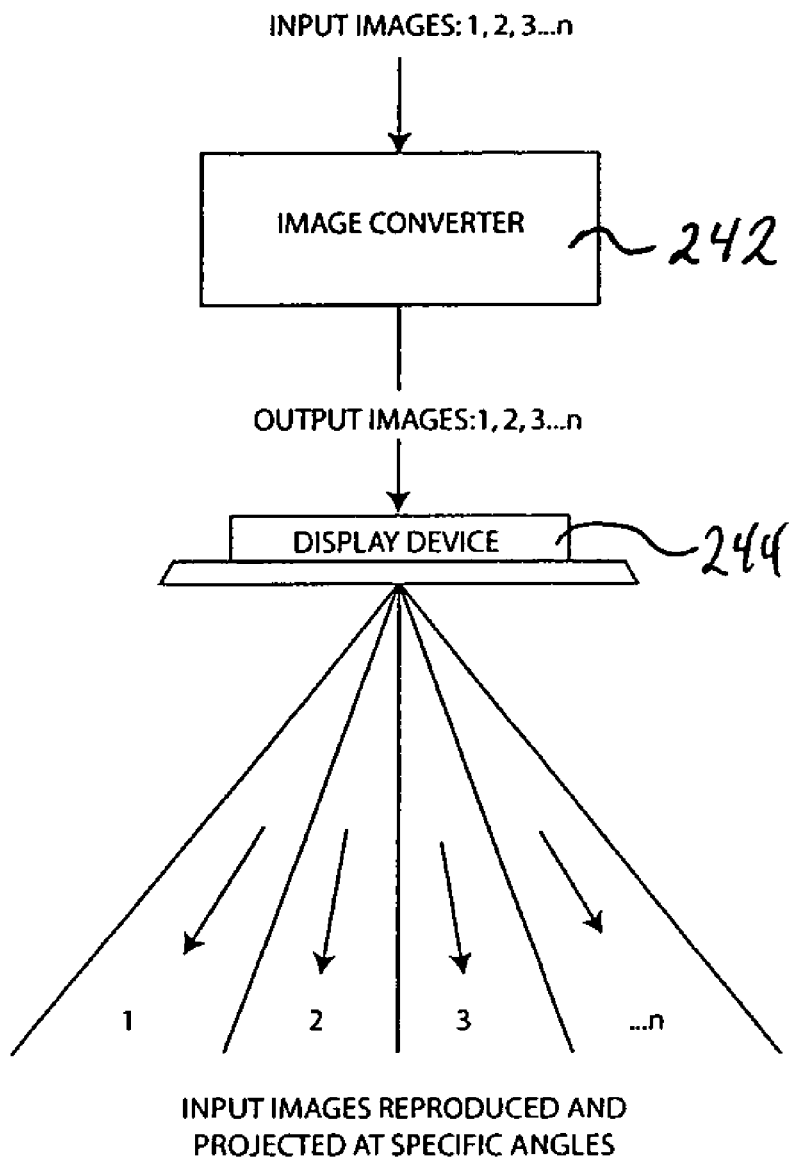
FIG. 24 is a diagrammatic representation of the image conversion process according to an aspect of the invention.

FIG. 24 shows the image conversion process and its relationship with respect to input images and the display device, in accordance with an aspect of the invention. The input images 1, 2, 3 . . . n, may be described as being 2-Dimensional electronic (digital or analog) image files of any format. The images may be separate files, or may be grouped together as frames in a view or animation sequence. Examples of digital image types include those formatted as Jpeg, Pict, Tiff, Targa, Giff, Bitmap, etc. Other files types may also be included as well. Example video/animation formats for grouped frames include Quicktime, AVI, DV stream, video streams encoded with various MPEG compression techniques, NTSC video, PAL video, SECAM video, any High-Definition video format or any other format in which still images are grouped and transmitted electronically.

Image Converter

The image converter 242 may be implemented as software running in a general purpose CPU or GPU, or as a hardware solution within a specialized graphics card. In either case, the converter's process is configured to compliment the specific aperture-scanning pattern and image resolution of a given Scanning Aperture 3-Dimensional Display device. In the case that the display device is reconfigurable to different resolutions and scan configurations, the image converter will likewise be configurable in its conversion process.

Output Images

The output images 1, 2, 3 . . . n from converter 242 may be described as being 2-Dimensional electronic (digital or analog) image files of any format. The images may be separate files, or may be grouped together as frames in a video or animation sequence. Example digital image types include those formatted as Jpeg, Pict, Tiff, Targa, Giff, Bitmap, but may include other file types as well. Example video/animation formats for grouped frames include Quicktime, AVI, DV stream, video streams encoded with various MPEG compression techniques, NTSC video, PAL video, SECAM video, any High-Definition video format or any other format in which still images are grouped and transmitted electronically.

The number of output images is equal to the number of input images, and each output image contains information from every input image. If the number of input images is fewer than the desired number of output images, the number is increased to match by one of several methods prior to applying the image conversion technique. Possible methods include the following:
1) Blank images, or images carrying no visual information may be added to the set of input images in some desired order;
2) Input images may be duplicated and added to the set of input images in some desired pattern or order; or
3) Interpolation software of some kind may be applied to the set of input images to generate additional input images. This may include any of a variety of frame-to-frame morphing techniques, direct frame blending, or the use of line-based interpolation using epipolar plane images.

In the case that fewer output images are desired than there are input images, one of three techniques will generally be used:
1) A number of input images are dropped from the set prior to applying the image converter;
2) A number of output images are dropped from the set after the image converter is applied; or
3) Only the appropriate number of output images is formed from a larger number of input images.

In the exemplary embodiments shown, the number of input images is equal to the number of output images, and is equal to the number of discreet viewing angles to be produced by the display device.

Display Device

Output images are formatted to be displayed on a specifically configured Scanning Aperture 3-Dimensional Display Device 244. They are fed directly into the display device 244, which will hold some number of the images in its display buffer. Alternately, the output images may be stored in an image buffer or data storage medium separate from the actual display device. The output images, when displayed, are directly mapped onto the image plate layer of the display device, and ate rapidly cycled in some predetermined sequence in time with the aperture plate.

Reconstructed Images

The reconstructed images, shown in FIG. 24 as radiating away from the front surface of the display device 244, are identical to the original input images. Each is viewable from within a narrow range of viewing angles with respect to the display device. Depending on the viewer's distance from the screen, and horizontal/vertical positioning with respect to the display, the viewer may observe:

1) Only one fully isolated input image, seen to fill the entire screen; or
2) Two or more input images seen to partly cover the screen, as is the case when a viewer is within the transition region between two discreet angles, or when a viewer is close enough to the screen to allow for a considerable difference in viewing angle with respect to opposite edges of the display screen.

When appropriate input images are used in the case that separate reconstructed images fall on each of the observer's eyes, a convincing stereo effect may be achieved.

Basic 1-Axis Conversion Method

Figure 25:
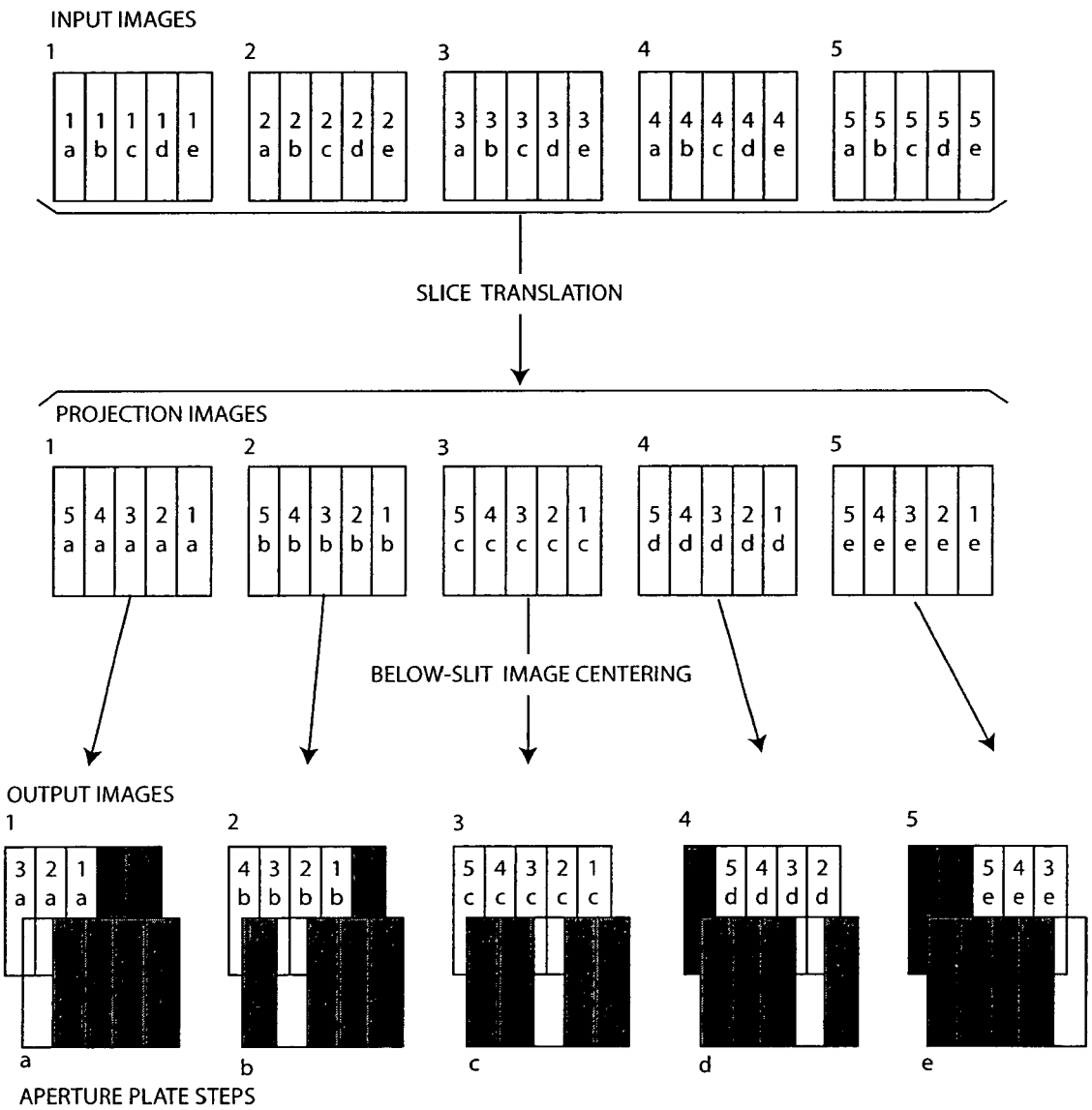
FIG. 25 is a diagrammatic representation of a basic 1 axis conversion method according to an aspect of the invention.

FIG. 25 shows the most basic process for converting a set of input images into a set of output images that are formatted for use in a Scanning Aperture 3-Dimensional Display device. This and the other conversion methods described herein consist of two key steps:
1) Slice Translation, by which columns of pixels from the set of input images are rearranged to create a set of output images; and
2) Below-Slit Image Centering, by which each image in the set of output images is shifted along the horizontal axis for the purpose of placing the center of that image directly behind the aperture through which the image is intended to be viewed. (In operation, every 'open' slit in the aperture plate will have an output image centered directly behind it on the image plate.)

FIG. 25 illustrates these key steps. Note that the example in FIG. 25 assumes that only one aperture at a time will be 'open' on the aperture plate. This simplification is made for the sake of clarity, and an example of multi-slit conversion is described later.

In the example shown, five input images (1-5) are shown, though there may be any number of input images in a real conversion system. Each of the five example input frames are divided into five vertical columns (a-e), or 'slices,' one for each discreet angle displayed by the actual display device. Each slice in this simplified example is labeled numerically by its input-image number, and alphabetically by its spatial position, left to right.

Slice Translation

The slices of each frame of the set of input images are rearranged to produce the set of 'projection images.' Notice that each projection image consists of slices taken from every input image. Each slice, however, was taken from the same spatial location in each of the input frames. Also note that the order of input image slice numbers comprising each projection frame descends from last to first, left to right. This reversal essentially accounts for the spatial 'flip' observed when an image is projected through an aperture such as a pinhole or a slit. (When using Scanning Aperture Display Devices having the 'front-screen' configuration, the input image slice order must be arranged in increasing order, first to last from left to right.) Slice translation will be accomplished either by means of software running on a general purpose CPU or GPU, or as a hardware solution within a specialized graphics card.

The spatial location from which each slice was taken shifts from left to right in successive projection images. This is appropriate for a display device whose aperture plate cycles in transparency from left to right. (See "Aperture Plate Steps" at the bottom of FIG. 25). It is not necessary that the display device cycles its apertures left to right, or right to left; they can be cycled in any order as long as each of X apertures is activated during X steps during a full image cycle, and the image plate steps follows the same pattern within a given cycle.

Below-Slit Image Centering

The projection images are each translated horizontally by some number of slice-widths in order to place the center of each projection image (in this case slices marked with "3") below the position of the open-aperture. Except for the middle output image, this results in some part of the projection image falling off the edge of the actual output image. This "vignetting" effect, though apparent in the example given, is not severe when considering image conversion that involves more than one open aperture at a time, as discussed below. The vignetting effect can also be directly compensated for by simply providing wider input images, and then cropping the excessive information during the image centering stage. Alternatively, the display screen could be constructed so that the aperture plate is narrower than the display plate.

Figure 26:
FIG. 26 is an exemplary diagram showing the basic conversion of input source images for angle specific viewing according to an aspect of the invention.
Figure 27:
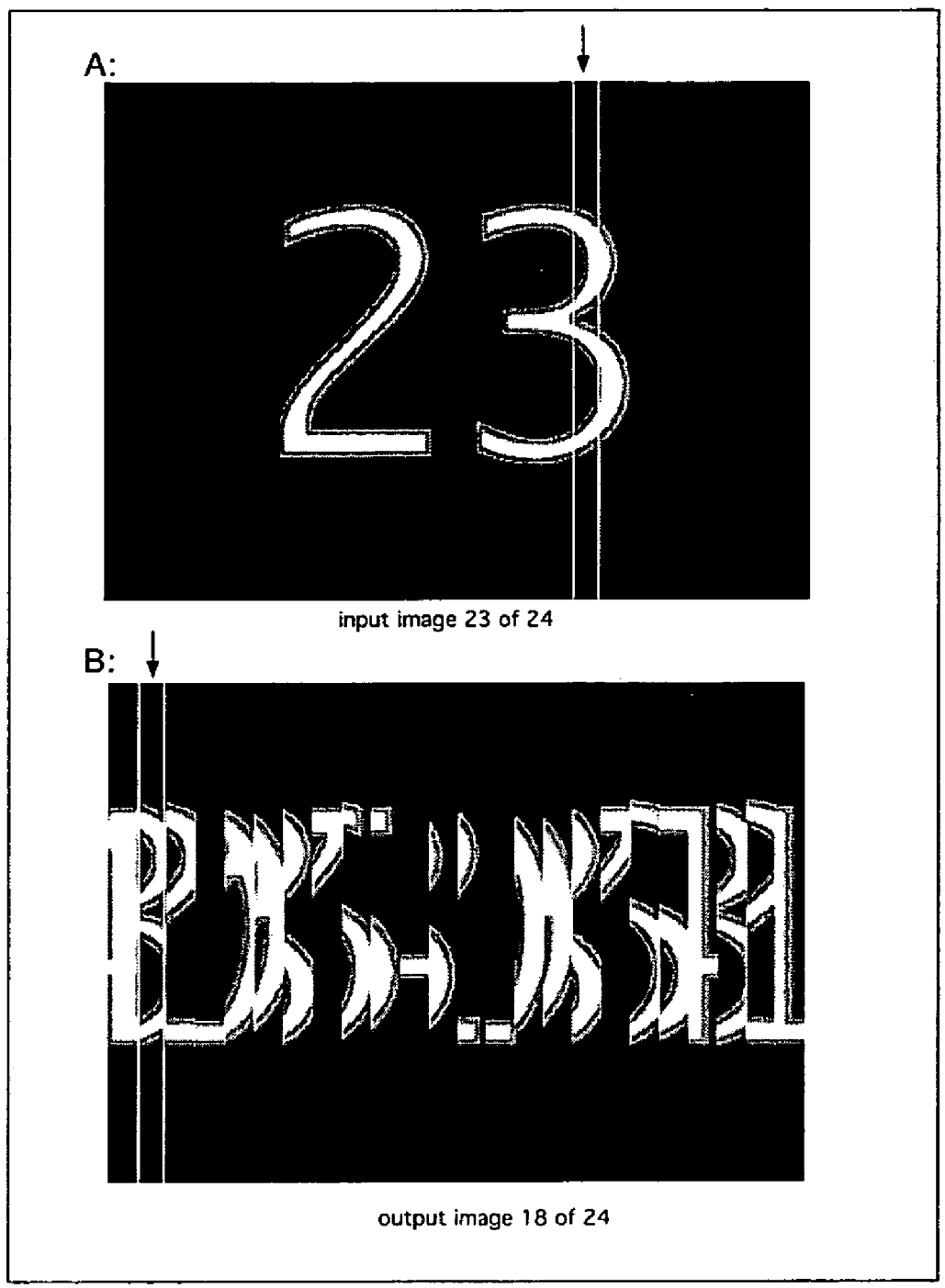
FIG. 27 is an exemplary illustration of the conversion of a vertical column of the input image for angle specific viewing according to an aspect of the invention.
Figure 28:
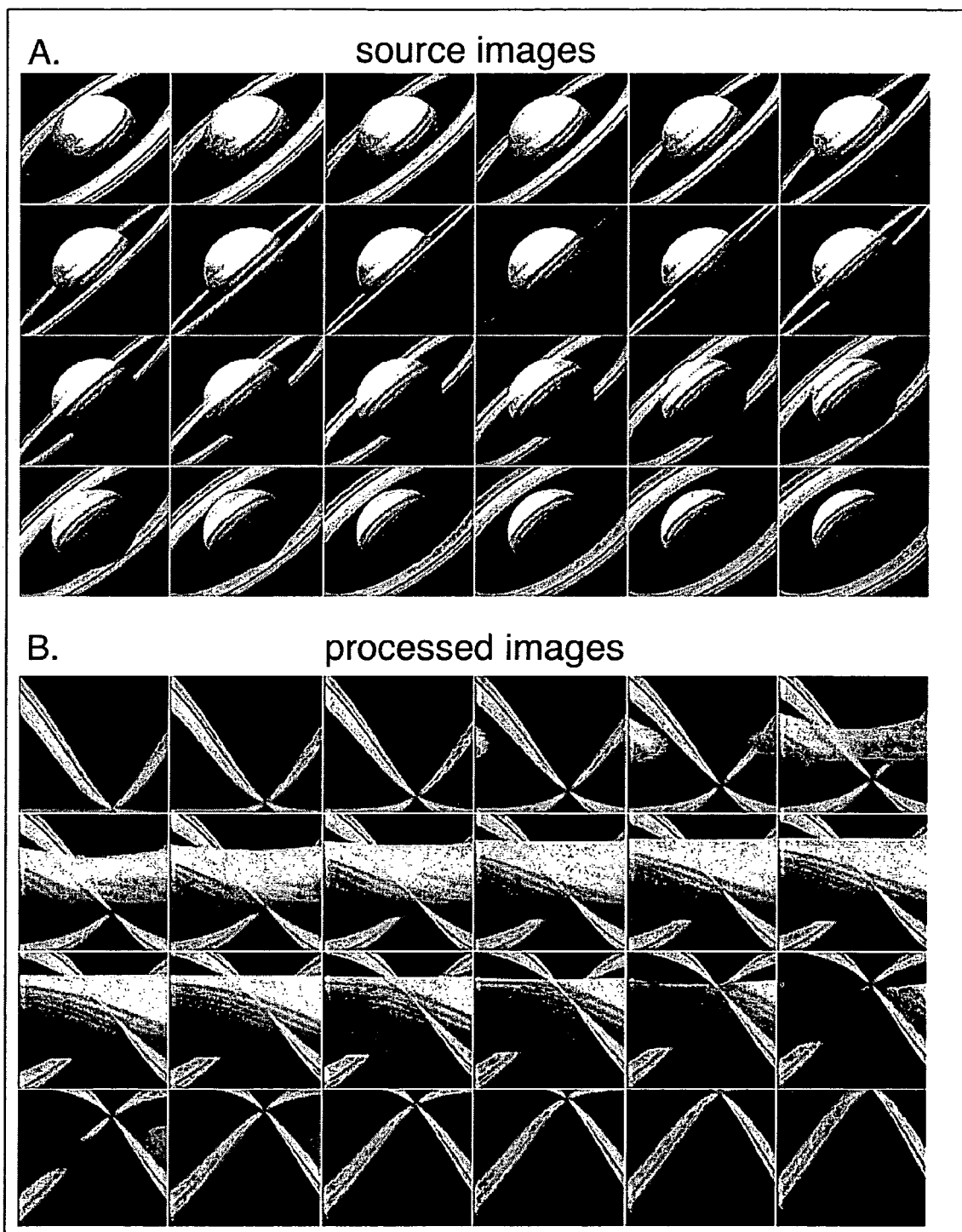
FIGS. 28A & 28B are an exemplary diagram showing the conversion of an input source for a higher resolution angle specific viewing according to an aspect of the invention.
Figure 29:
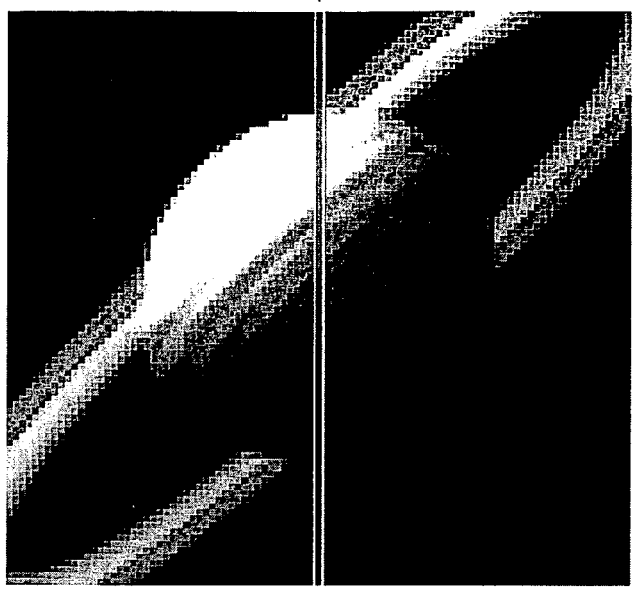
FIGS. 29A & 29B are an exemplary diagram illustrating a vertical column from an input image being placed into a single output image.
Figure 29:
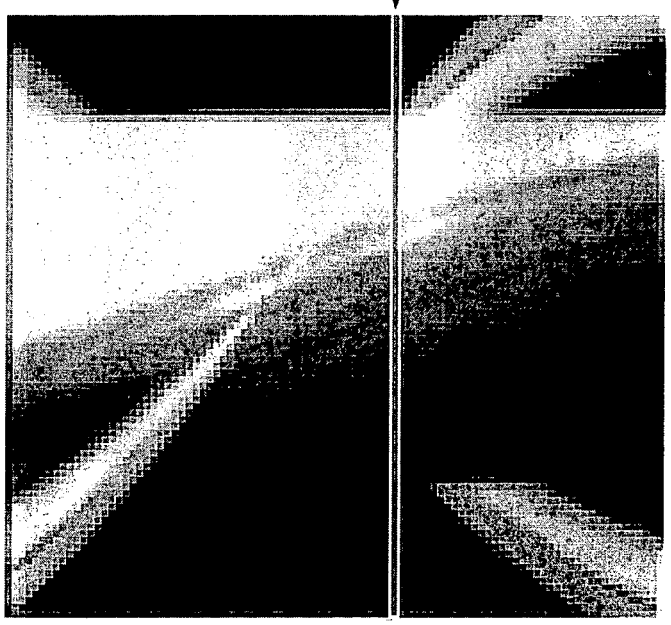

FIGS. 26, 27, 28 and 29 demonstrate two sets of images that were converted using the basic 1-axis method of the present invention. FIG. 26 shows input source images 1-24 in set A that are processed by the disclosed basic conversion technique to produce the output images of set B. The output image set B is re-assembled into set A when viewed through a Scanning Aperture 3-Dimensional Display Device. FIG. 27 illustrates a vertical column from an input image being placed into a single output image. As indicated, the highlighted column is from the input image and corresponds to the column in the output image. FIG. 28 shows a plurality of input images of Saturn in set A which are processed in accordance with the basic conversion technique to produce the output images of set B. To produce this higher resolution set, 96 actual images are used and 24 of the 96 actual output images were selected at regular intervals for set B. FIG. 29 illustrates a vertical column from an input image being placed into a single output image.

"Multi-Slit" 1-Axis Conversion Method

The following is a more practical method for converting high-resolution images into a format that can be viewed with a Scanning Aperture 3-Dimensional Display. This method expands upon the fundamental steps of the aforementioned Basic 1-Axis method by including an aperture plate in which multiple apertures may be "open" or transparent at a time. In accordance with one aspect of the invention, the method includes the following steps:
1) Slice Translation, by which columns of pixels from the set of input images are rearranged to create a set of output images; and
2) Below-Slit Image Centering, by which each image in the set of output images is shifted along the horizontal axis for the purpose of placing the center of that image directly behind the aperture through which the image is intended to be viewed, (In operation, multiple slits will be 'open' across the face of the aperture plate. Behind each aperture are centered 'bands' of image data on the image plate. Each 'band' consists of a number of vertical columns placed side-by-side, and equal in number to the number of discreet viewing angles for that particular image set.)

Input Images

Figure 30:
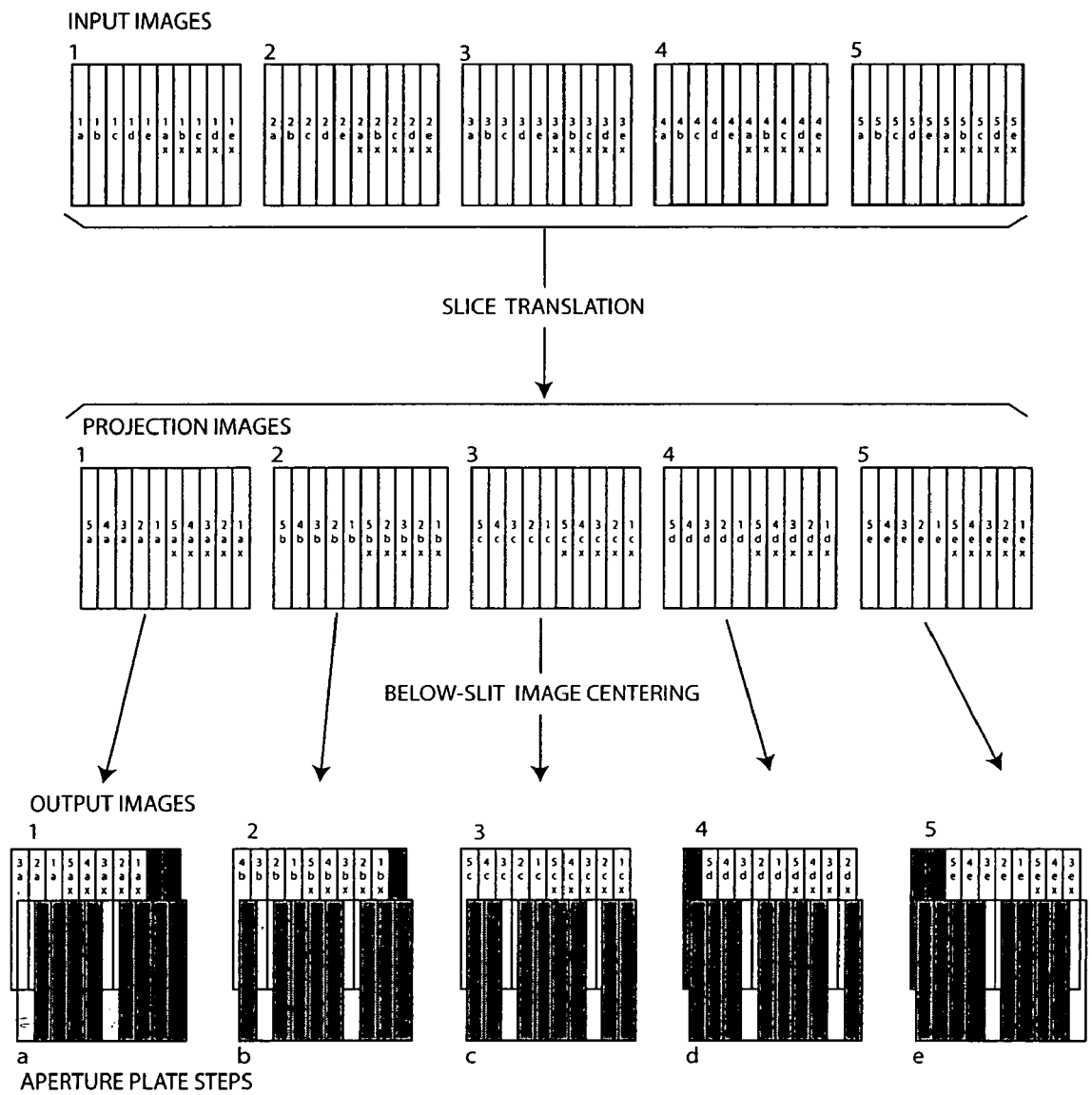
FIG. 30 is a diagrammatic representation of a multi-slit 1 axis conversion of an input source of images for angle specific viewing for 5 discreet viewing angles, according to an aspect of the invention.

FIG. 30 illustrates an example implementation of the multi-slit 1-axis conversion method according to an aspect of the invention. It depicts five input images, though there may be any number of input images in a real conversion system.

Each of the five example input frames are divided into ten vertical columns, or 'slices.' Since there are to be only five output images, the converter will support a display device that produces five discreet angles. Note that the slits are labeled spatially by letters, and repeat after five:

| a | b | c | d | e | a | b | c | d | e |
|---|---|---|---|---|---|---|---|---|---|
|   |   |   |   |   | x | x | x | x | x |

In order to make each slice individually distinguishable, the label x is added below the repeated letters. The pattern repeats in each of the five input frames in this example. For high-resolution input frames, the pattern could repeat many times. If, for example, an input image was 800 slices wide, and there were 25 discreet angles, there would be 160 repeated bands of ascending-order labeled slices (800/25=32).

In full-resolution conversion systems, each vertical column is ideally one pixel wide. This allows for the maximum density of 'bands' on the output images, which minimizes vignetting and maximizes the number of apertures open at once on the aperture plate. Maximizing the number of apertures allows the screen to be produced with minimized separation between the image and the aperture plate.

Slice Translation

The slices of each frame of the set of input images are rearranged to produce the set of 'projection images.' Each projection image consists of slices taken from every input image. Each slice, however, was taken from the same spatial location in each of the input frames. Also notice that the order of input image slice numbers making up each projection frame descends from last to first, left to right and repeats. Again, this reversal essentially accounts for the spatial 'flip' observed when an image is projected through an aperture such as a pinhole or a slit (when using Scanning Aperture Display Devices having the 'front-screen' configuration, the input image slice order must be arranged in increasing order, first to last from left to right). Slice translation will be accomplished either by means of software running on a general purpose CPU or GPU, or as a hardware solution within a specialized graphics card.

The spatial location from which each slice was taken shifts from left to right in successive projection images (a, b, c . . . ). This is appropriate for a display device whose aperture plate cycles in transparency from left to right. (See "Aperture Plate Steps" at the bottom of FIG. 30.) It is not necessary that the display device cycles its apertures left to right, or right to left; they can be cycled in any order as long as each of X apertures is activated during X cycles and the cycle pattern of the image plate follows the same pattern. It is important to note that the slices are now composed as two separate 'bands', those with letters marked, "a, b, c . . . " and those marked, "a/x, b/x, c/x . . . "

Below-Slit Image Centering

The projection images are each translated horizontally by some number of slice-widths in order to place the center of each projection 'band' (in this case slices marked with the number '3') below the position of the open-aperture. With the exception of the middle output image, this results in some part of the projection image falling off the edge of the actual output image. This vignetting effect is not as severe as in the previous example because there are more overall slices for the same number of slices that are eclipsed. The effect can also be directly compensated for by simply providing wider input images, and then cropping the excessive information during the image centering stage. Alternatively, the display screen could be constructed so that the aperture plate is narrower than the display plate.

This 'multi-slit' method can be used to format content for high-resolution computer displays, as well as for multi-channel systems that display different 2-D images to different viewers. In a full implementation, the number of slices will be expanded to hundreds, and the number of discreet angles, hence repeated bands and open apertures would be expanded to tens or perhaps 100 or more. The inherent limitation of both 1-Axis systems is that the parallax is limited to only the horizontal axis; a viewer can look around displayed 3-D objects, but cannot look above or below them. This limitation is corrected by displays that use the following 2-axis format.

The following is a comprehensive mathematical algorithm for generating output images from input images using the single-axis multi-slit technique just described. The algorithms have been tested by implementing them with the Python programming language, compiling to run in the Macintosh OSX BSD Unix terminal. It should be noted that they algorithms can be implemented in any computer language, and run on any image processing platform, including specialized or dedicated GPU cards. The algorithms describe the way to construct frames by means of Forward Mapping Iteration and Reverse Mapping Iteration. In each case, a below slit "centering" and below slit "non-centering" version of the algorithm is given. For convenience, the base equations for the equations are also listed with their terms:

Single Axis Column Translation Algorithm Equations

A=Number of discreet angles, or total input frames, in the system
X=Number of columns per input frame and output frame
FI[ ]=set of input frames
FO[ ]=set of output frames
FI[n]=n'th input frame
FO[n]=n'th output frame
FI[n].col[x]=x'th column in n'th input frame
FO[n].col[x]=x'th column in n'th output frame
(0 . . . N−1)=range of integer values from 0 up to and including N−1
fi=input frame index
fo=output frame index
ci=input column index
co=output column index Non-Centering Reverse Mapping
Given output column co in output image fo, find input column ci in input image ci
    fi=A−1−co+A*int(co/A)
    ci=fo+A*int(co/A)

Non-Centering Forward Mapping
Given input column ci in input image fi, find output column co in output image co
    fo=ci−A*int(ci/A)
    co=A−1−fi+A*int(ci/A)

Centering Reverse Mapping
Given output column co in output image fo, find input column ci in input image ci
    fi=A−1−co−int(A/2)+fo+A*int((co+int(A/2)−fo)/A)
    ci=fo+A*int((co+int(A/2)−fo)/A)

Centering Forward Mapping
Given input column ci in input image fi, find output column co in output image co
    fo=ci−A*int(ci/A)
    co=A−fi−1−int(A/2)+ci Forward Mapping Iterating Algorithm, Non-Centering:
For all input frames indices fi in (0 ... A−1)
    for all columns ci in (0 ... X−1)
        fo=ci−A*int(ci/A)
        co=A−1−fi+A*int(ci/A)
        Copy pixels from FI[fi].col[ci] to FO[fo].col[co]

Forward Mapping Iterating Algorithm, Centering:
For all input frames indices fi in (0 ... A−1)
    for all columns ci in (0 ... X−1)
        fo=ci−A*int(ci/A)
        co=A−fi−1−int(A/2)+ci
        Copy pixels from FI[fi].col[ci] to FO[fo].col[co]

Reverse Mapping Iterating Algorithm, Non-Centering:
For all output frames indices fo in (0 ... A−1)
    for all columns co in (0 ... X−1)
        fi=A−1−co+A*int(co/A)
        ci=fo+A*int(co/A)
        Copy pixels from FI[fi].col[ci] to FO[fo].col[co]

Reverse Mapping Iterating Algorithm, Centering:
For all input frames fo of Fo
    for all columns co in fo
        fi=A−1−co−int(A/2)+fo+A*int((co+int(A/2)−fo)/A)
        ci=fo+A*int((co+int(A/2)−fo)/A)
        Copy pixels from FI[fi].col[ci] to FO[fo].col[co]

Basic 2-Axis Conversion Method

In accordance with another aspect of the invention, a series of images may be formatted in order to be displayed by a two-axis Scanning Aperture 3-Dimensional display device. Unlike the previously mentioned techniques, the input images are divided into rectangular 'sections' rather than vertical 'strips.' The basic steps of the process, however, are essentially the same.

The steps include the following:
1) Section Translation. Sections of pixels from the set of input images are rearranged to create a set of output images (See FIG. 31); and
2) Below-Aperture Image Centering. Each image in the set of output images is shifted along the vertical and/or horizontal axis for the purpose of placing the center of that image directly behind the aperture through which the image is intended to be viewed (See FIG. 32).

Section Translation

Figure 31:
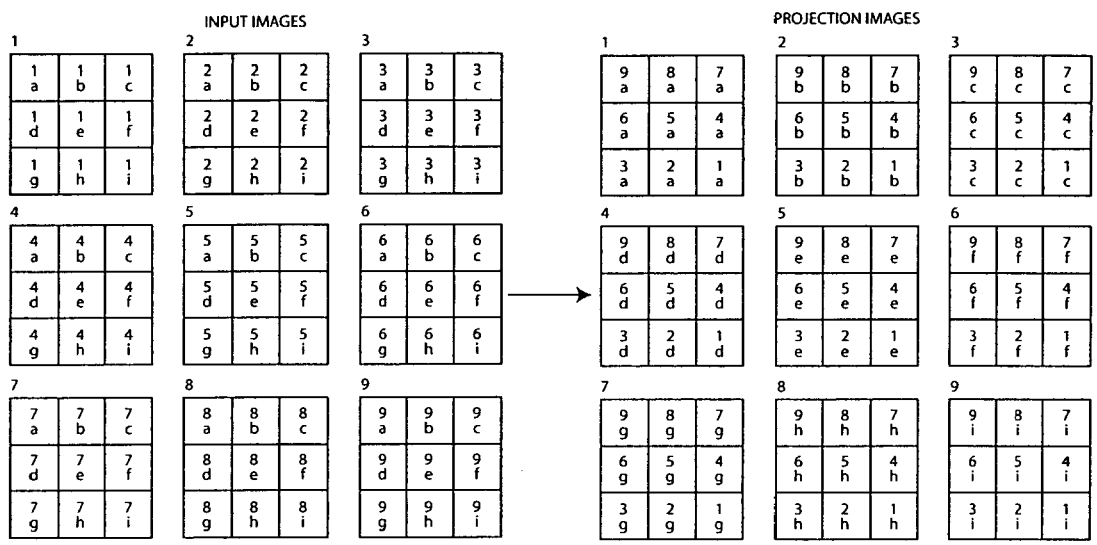
FIG. 31 is a diagrammatic representation of the section translation of a basic 2-axis conversion method according to an aspect of the invention.

FIG. 31 illustrates basic 2-axis section translation for a 2-axis Scanning Aperture 3-Dimensional Display device according to an aspect of the invention. Each of 9 input images is divided into rectangular sections and given labels. These sections are reconfigured into 9 projection frames. Each projection frame is comprised of one section of every input image, and is assembled so that the numerical order runs left to right, top to bottom. This process basically accounts for the image 'flip' that occurs when an image is projected through a pinhole. A full resolution 2-axis display is likely to have hundreds of sections per input image, and would follow the same translation procedure. However, it is not always necessary that there be an equal number of vertical and horizontal sections. More likely, a 2-axis display has more horizontal sections (therefore more horizontal angles) than vertical sections. The translation procedure, however, will remain consistent in terms of its reverse-order numbering, as long as the display plate is placed behind the aperture plate.

Below-Pinhole Image Centering

Figure 32:
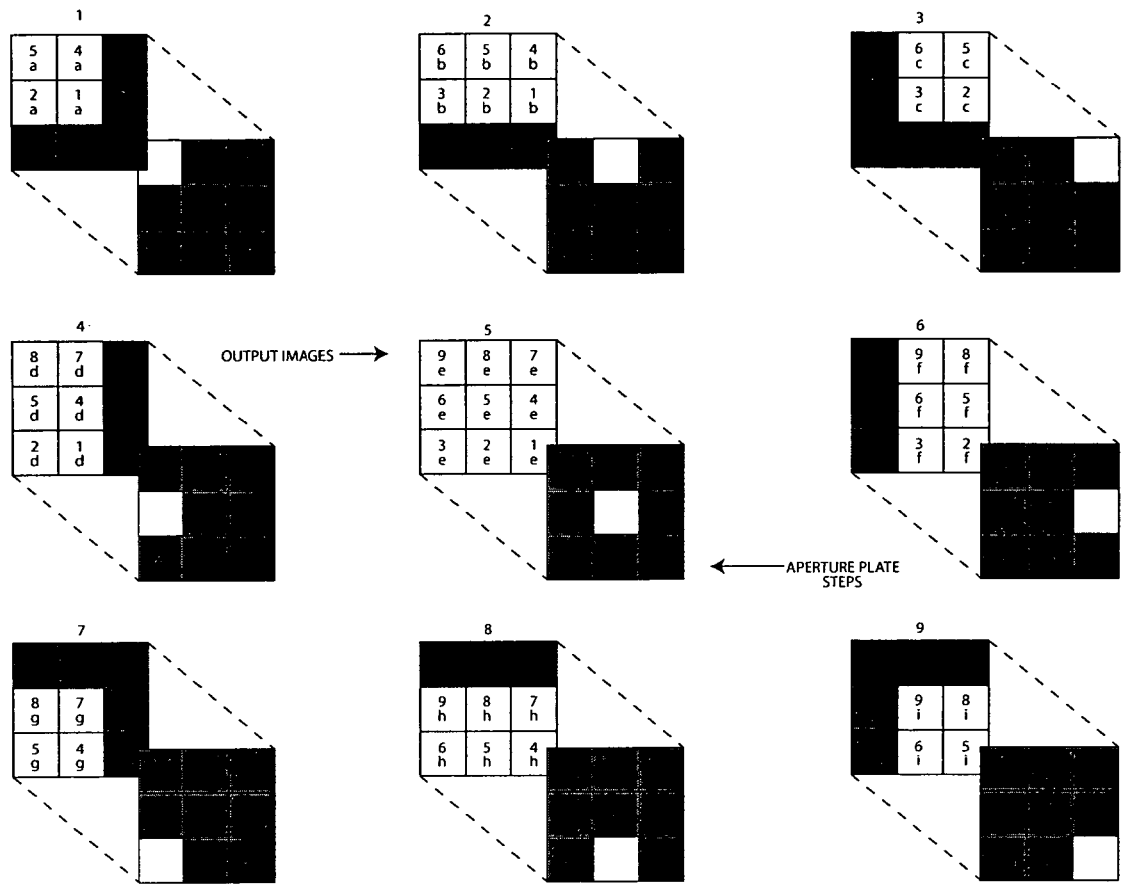
FIG. 32 is a diagrammatic representation of the below-pinhole image centering

FIG. 32 demonstrates the centering procedure for 2-axis projection images. The center most section from each projection image (in this case those labeled with the number 5) is placed directly behind the aperture plate's 'open' aperture. The aperture plate steps through its scanning sequence left to right, top to bottom in this illustration, but this order is not important. The matching of the centered projection image to the appropriate aperture position, however, is critical.

This single-pinhole display example has considerable limitations in terms of its resolution and the presence of vignetting. Just as in the 1-axis system, however, these problems are overcome by increasing the number of sections and apertures for each image in the process. The effect can also be directly compensated for by simply providing wider input images, and then cropping the excessive information during the image centering stage. Alternatively, the display screen could be constructed so that the aperture plate is narrower than the display plate.

It will be apparent that the conversion method described herein is not specifically related to the content of the input images or the end application of the screen, and is simply a tool to place images into the screen's angle-specific viewing channels. Any end application of the screen, be it for 3-dimensional display, 2-dimensional multi-channel display, or some combination of the two, will rely on this basic conversion process.

While there has been shown, described and pointed out fundamental novel features of the invention as applied to preferred embodiments thereof, it will be understood that various omissions, substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed, described or suggested form or embodiment as a general matter of design choice. It is the intention, therefore, to be limited only as indicated by the scope of the claims appended hereto.

What is claimed is:

1. A method for formatting images for angle specific viewing in a scanning aperture display device comprising:
    selecting an input column index (ci) and an input frame index (fi);
    determining a desired output frame index (fo) relating to the selected input column index;
    determining a desired output column index (co) using the selected input frame index and selected input column index; and
    building the desired output column in the desired output frame by copying image information within the determined input column within the determined input frame into the desired output frame within the desired output column; and
    centering the built image behind a set of cycling apertures, wherein said output frame index (fo) is calculated using the following relation:

$$fo = ci - A * \text{int}(ci/A)$$

where A is a number of discreet viewing angles, and int is an integer value.

2. A method for formatting images for angle specific viewing in a scanning aperture display device comprising:
- selecting an input column index (ci) and an input frame index (fi);
- determining a desired output frame index (fo) relating to the selected input column index;
- determining a desired output column index (co) using the selected input frame index and selected input column index; and
- building the desired output column in the desired output frame by copying image information within the determined input column within the determined input frame into the desired output frame within the desired output column; and
- centering the built image behind a set of cycling apertures, wherein said output column index (co) is calculated using the following relation:

$$co = A-1-fi+A*\text{int}(ci/A)$$

where A is a number of discreet viewing angles, and int is an integer value.

3. A method for formatting images for angel specific viewing in a scanning aperture display device comprising:
- selecting an input column index (ci) and an input frame index (fi);
- determining a desired output frame index (fo) relating to the selected input column index;
- determining a desired output column index (co) using the selected input frame index and selected input column index; and
- building the desired output column in the desired output frame by copying image information within the determined input column within the determined input frame into the desired output frame within the desired output column; and
- centering the built image behind a set of cycling apertures, wherein said output column index (co) is calculated using the following relation:

$$co = A-fi-1-\text{int}(A/2)+ci$$

where A is a number of discreet viewing angles, and int is an integer value.

4. A method for formatting images for angle specific viewing in a scanning aperture display device comprising:
- selecting an output column index (co) and an output frame index (fo);
- determining a source input frame index (fi) relating to the selected output column index;
- determining a source input column index (ci) using the selected output frame index and selected output column index;
- building the selected output column index in the selected output frame index by copying image information within determined input columns within determined input frames, into selected output frames of selected output columns such that a first source input column index of an input frame is included in a first output frame and a second input column index of the input frame is included in a different output frame; and
- displaying at least one of said output frames by centering the built images behind a set of apertures, wherein said source input frame index (fi) is calculated using the following relation:

$$fi = A-1-co+A*\text{int}(co/A)$$

where A is a number of discreet viewing angles.

5. The method according to claim 4, wherein said determining of said input frame index is performed for all output frame indices (fo) in (0 ... A-1), for all output columns indices (co) in (0 ... X-1), where X is the total number of output column indices.

6. A method for formatting images for angle specific viewing in a scanning aperture display device comprising:
- selecting an output column index (co) and an output frame index (fo);
- determining a source input frame index (fi) relating to the selected output column index;
- determining a source input column index (ci) using the selected output frame index and selected output column index;
- building the selected output column index in the selected output frame index by copying image information within determined input columns within determined input frames, into selected output frames of selected output columns such that a first source input column index of an input frame is included in a first output frame and a second input column index of the input frame is included in a different output frame; and
- displaying at least one of said output frames by centering the built images behind a set of apertures, wherein said step of determining source input column index is calculated using the following relation:

$$ci = fo+A*\text{int}(co/A)$$

where A is a number of discreet viewing angles and int is an integer value.

7. A method for formatting images for angle specific viewing in a scanning aperture display device comprising:
- selecting an output column index (co) and an output frame index (fo);
- determining a source input frame index (fi) relating to the selected output column index;
- determining a source input column index (ci) using the selected output frame index and selected output column index;
- building the selected output column index in the selected output frame index by copying image information within determined input columns within, determined input frames, into selected output frames of selected output columns such that a first source input column index of an input frame is included in a first output frame and a second input column index of the input frame is included in a different output frame; and
- displaying at least one of said output frames by centering the built images behind a set of apertures, wherein said source input frame index is calculated using the following relation:

$$fi = A-1-co-\text{int}(A/2)-fo-A*\text{int}((co-\text{int}(A/2)-fo)/A)$$

where A is a number of discreet viewing angles.

8. A method for formatting images for angle specific viewing in a scanning aperture display device comprising:
- selecting an output column index (co) and an output frame index (fo);
- determining a source input frame index (fi) relating to the selected output column index;
- determining a source input column index (ci) using the selected output frame index and selected output column index;
- building the selected output column index in the selected output frame index by copying image information within determined input columns within determined input frames, into selected output frames of selected output columns such that a first source input column index of an input frame is included in a first output frame and a second input column index of the input frame is included in a different output frame; and displaying at least one of said output frames by centering the built images behind a set of apertures, wherein said step of determining source input column index is calculated using the following relation:

$$ci = fo + A * \text{int}((co + \text{int}(A/2) - fo)/A)$$

where A is a number of discreet viewing angles and int is an integer value.

9. The method according to claim 8, wherein said calculating of the input frame index (fi) relating to the selected output column index (ci) is performed for all output frame indices fo in (0 ... A−1), for all columns co in (0 ... X−1), where X is X is the total number of output column indices.

10. A method for formatting images for angle specific viewing in a scanning aperture display device comprising:

selecting an output column index (co) and an output frame index (fo);

determining a source input frame index (fi) relating to the selected output column index;

determining a source input column index (ci) using the selected output frame index and selected output column index;

building the selected output column index in the selected output frame index by copying image information within determined input columns within determined input frames, into selected output frames of selected output columns such that a first source input column index of an input frame is included in a first output frame and a second input column index of the input frame is included in a different output frame; and displaying at least one of said output frames by centering the built images behind a set of apertures, wherein said copying is performed according to the following relation:

copy pixels from FI[fi] . col[ci] . to FO[fo] . col[co]

where FI[fi] is the set of input frames corresponding to the input frame indices (fi), FO[fo] is the set of output frames corresponding to output frame indices (fo), col[ci] is the corresponding input columns based on the input column indices (ci) and col[co] is the corresponding output columns based on the output column indices (co).

* * * * *